United States Patent
Dahlman et al.

(10) Patent No.: US 7,440,489 B2
(45) Date of Patent: Oct. 21, 2008

(54) METHOD AND APPARATUS FOR SELECTIVE DEMODULATION AND DECODING OF COMMUNICATIONS SIGNALS

(75) Inventors: Erik Dahlman, Bromma (SE); Yi-Pin Eric Wang, Cary, NC (US); Paul W. Dent, Pittsboro, NC (US); Gregory E. Bottomley, Cary, NC (US); Ali Khayrallah, Apex, NC (US); Christer Östberg, Staffanstorp (SE)

(73) Assignee: Ericsson Inc., Research Triangle Park, NC (US)

( * ) Notice: Subject to any disclaimer, the term of this patent is extended or adjusted under 35 U.S.C. 154(b) by 1474 days.

(21) Appl. No.: 09/923,374

(22) Filed: Aug. 7, 2001

(65) Prior Publication Data

US 2003/0031236 A1   Feb. 13, 2003

(51) Int. Cl.
 *H04K 1/00* (2006.01)
 *H04B 15/00* (2006.01)
 *H04L 27/30* (2006.01)
(52) U.S. Cl. .................. 375/147; 375/150; 375/316
(58) Field of Classification Search ................. 375/130, 375/140, 141, 142, 147, 144, 148, 150, 316, 375/377; 455/130, 132, 133, 135
 See application file for complete search history.

(56) References Cited

U.S. PATENT DOCUMENTS

| | | |
|---|---|---|
| 5,151,919 A | 9/1992 | Dent |
| 5,208,829 A * | 5/1993 | Soleimani et al. ........... 375/141 |
| 5,230,003 A | 7/1993 | Dent et al. |
| 5,305,349 A | 4/1994 | Dent |
| 5,517,530 A * | 5/1996 | Gardner ....................... 375/325 |
| 5,557,645 A | 9/1996 | Dent |
| 5,572,552 A | 11/1996 | Dent et al. |

(Continued)

FOREIGN PATENT DOCUMENTS

EP   0 453 814 A2   10/1991

(Continued)

OTHER PUBLICATIONS

"Universal receiver with slide inforamtion from the demodulators: an example for nonselective rician fading channels" Madhow et al IEEE, vol. 42, No. 7, Jul. 1994, pp. 2395-2405.*

(Continued)

*Primary Examiner*—Temesghen Ghebretinsae
(74) *Attorney, Agent, or Firm*—Coats & Bennett, P.L.L.C.

(57) ABSTRACT

A spread spectrum signal is processed by correlating the spread spectrum signal with a spreading sequence at a first plurality of correlation times to produce a first plurality of time-offset correlations. The first plurality of time-offset correlations is processed to produce a first symbol representation for a symbol. A first quality is determined for the first symbol representation. Responsive to the determined first quality, it is determined whether to further process the first symbol representation or to process a second symbol representation for the symbol generated from the spread spectrum signal. The first quality may be determined, for example, by decoding the first symbol representations to generate a decoding metric or error check indicator, such as a CRC result. The symbol representations may be generated and/or evaluated for quality in a serial fashion or a parallel fashion.

110 Claims, 11 Drawing Sheets

U.S. PATENT DOCUMENTS

| | | | |
|---|---|---|---|
| 5,619,513 A | 4/1997 | Shaffer et al. | |
| 5,841,816 A | 11/1998 | Dent et al. | |
| 6,148,023 A | 11/2000 | Pelin et al. | |
| 6,181,749 B1 * | 1/2001 | Urabe et al. | 375/267 |
| 6,259,721 B1 * | 7/2001 | Uesugi et al. | 375/130 |
| 6,363,104 B1 | 3/2002 | Bottomley | |
| 6,463,097 B1 * | 10/2002 | Held et al. | 375/225 |
| 6,570,910 B1 | 5/2003 | Bottomley et al. | |
| 6,683,924 B1 * | 1/2004 | Ottosson et al. | 375/343 |
| 6,714,585 B1 | 3/2004 | Wang et al. | |
| 6,788,669 B1 * | 9/2004 | Takano et al. | 370/342 |
| 6,801,565 B1 | 10/2004 | Bottomley et al. | |
| 6,922,434 B2 | 7/2005 | Wang et al. | |

FOREIGN PATENT DOCUMENTS

| | | | |
|---|---|---|---|
| EP | 0 550 143 A2 | 7/1993 | |
| WO | WO 00/35112 | 6/2000 | |
| WO | WO 0035112 A1 * | 6/2000 | |
| WO | WO 01/29982 | 4/2001 | |

OTHER PUBLICATIONS

Raphaeli, Dan, "Efficient Decoding Algorithms for Noncoherent Trellis Coded Phase Modulation," Proceedings of the Global Telecommunications Conference (Globecom), US, New York, IEEE, Nov. 28, 1994, pp. 1284-1288.

Standard Search Report, European Patent Office, U.S. Appl. No. 09/923,374, filed Apr. 25, 2002.

Lin, Shu and Costello, Daniel J, Jr., "Linear Block Codes." Error Control Coding: *Fundamentals and Applications* 1983, pp. 51-84, Prentice-Hall Series In Computer Applications In Electrical Engineering.

* cited by examiner

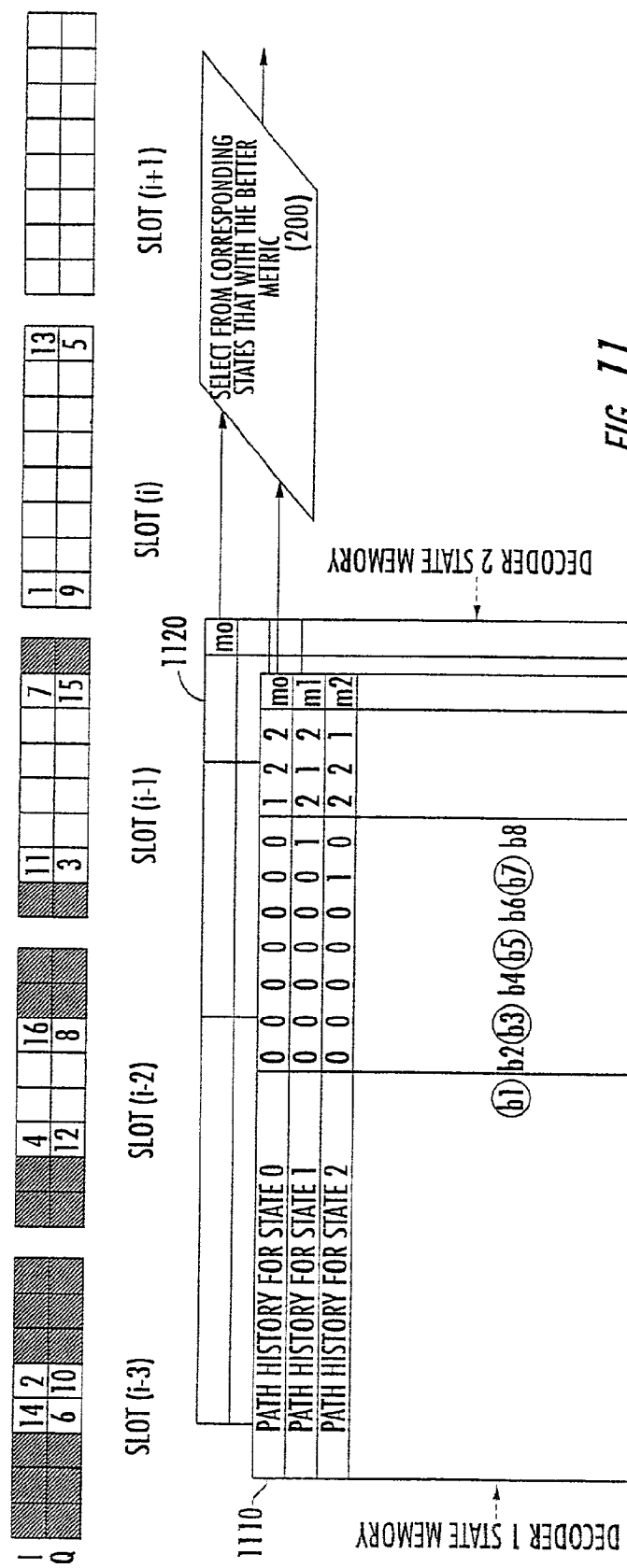
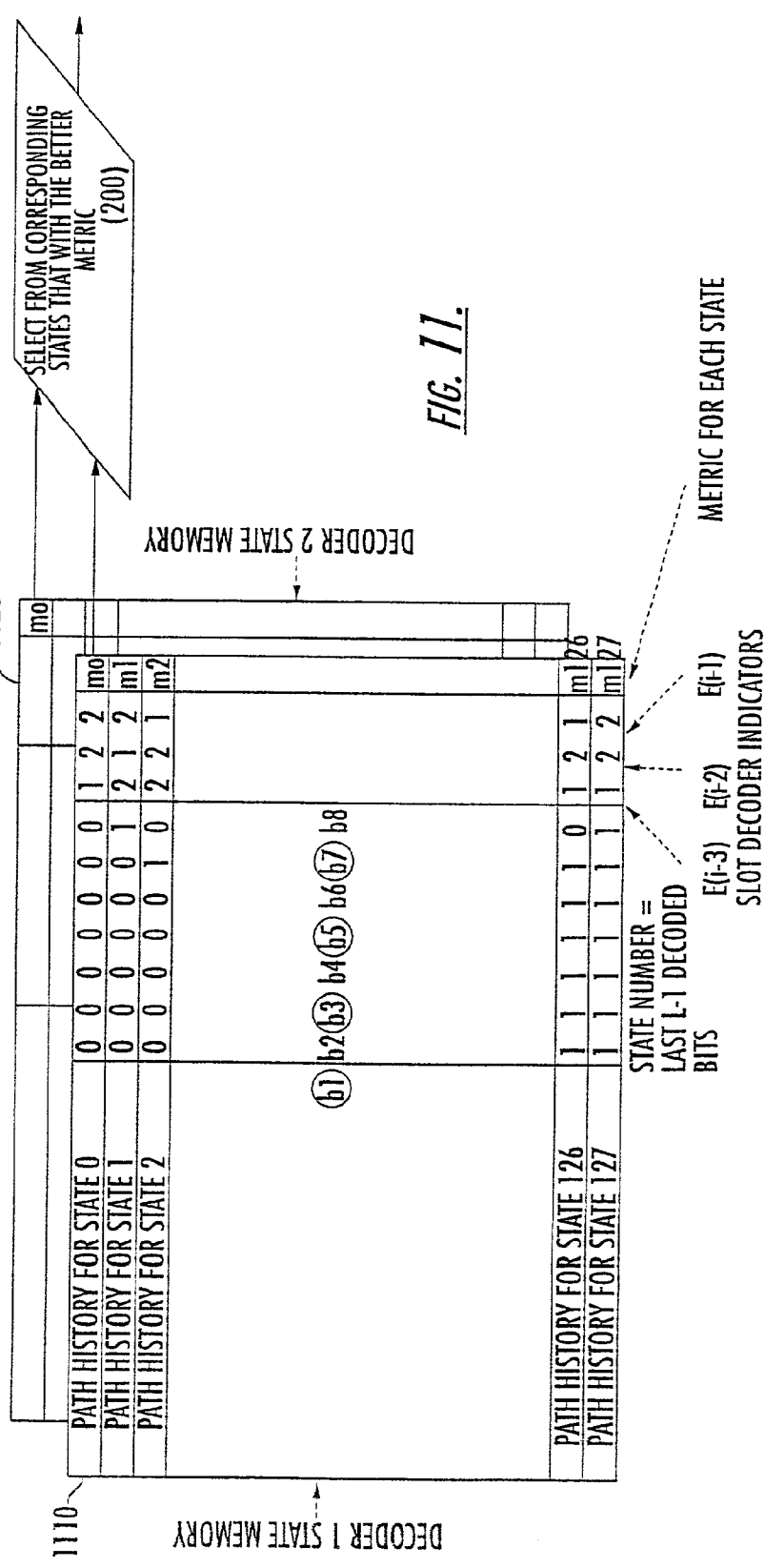
FIG. 10.
FIG. 11.

METHOD AND APPARATUS FOR SELECTIVE DEMODULATION AND DECODING OF COMMUNICATIONS SIGNALS

BACKGROUND OF THE INVENTION

The present invention relates to communications methods and apparatus, and more particularly, methods and apparatus for processing communications signals.

FIG. 1 illustrates a conventional receiver as may be used in a code division multiple access (CDMA) communications system. The receiver includes an antenna 10, which receives signals, and a radio processor circuit 11 that filters, amplifies and converts the received signals to a suitable form for processing, such as complex numerical sample values. The conventional receiver further includes a channel estimator 12 that correlates received signal samples with known symbols 14 (stored or generated locally) to determine channel estimates that are provided to a decoder 13. The decoder 13 processes the signal samples together with the channel estimates to extract information. For example, the decoder 13 may be a RAKE receiver as described in U.S. Pat. No. 5,305,349 to Dent et al. and U.S. Pat. No. 5,572,552 to Dent et al.

In typical conventional CDMA cellular communications systems complying with the IS-95 standard, a base station transmitter transmits a stream of known symbols referred to as a pilot code on the same channel as other, information bearing symbols, with the channel being modulated according to a spreading code. The transmitted signal is received over multiple paths. The channel estimator 12 correlates the received signal, which includes the pilot code and other information in additive superposition, and low-pass filters the resultant complex correlation to obtain channel estimates, which, in principle, are then known continuously. The received signal is correlated with different delays between the pilot code and the received signal to obtain channel estimates for each of the multiple paths. The received signal is also correlated with other codes carrying information to be decoded. The results of the correlations are multiplied by the conjugate of the channel estimate for the same delay, and the results are added to coherently combine the multipath signals. This can provide an optimum combination when white noise dominates.

U.S. Pat. No. 5,572,552 to Dent et al. illustrates that the well-known RAKE receiver for receiving and decoding CDMA signals through a multipath channel may not be optimal for CDMA cellular systems in which most of the interference with a desired signal at a mobile terminal comes from signals transmitted by the same cell site that transmits the desired signal, a type of interference commonly referred to as "own cell" interference. In the presence of such own-cell interference, an optimum receiver may be an inverse channel equalizer.

The aforementioned U.S. Pat. No. 5,572,552 also describes that, in a case in which there is mixed own-cell and other-cell interference, i.e., interference from signals transmitted in other cells, optimum reception may be achieved by combining despread values using combining weights that partly resemble prior art RAKE taps and partly resemble an inverse channel equalizer. Such a receiver has been referred to as a generalized RAKE (G-RAKE) receiver and may include variations in which values are despread or despread values are combined to achieve interference cancellation. Combining coefficients in such a receiver may be computed from estimates of the multipath channel coefficients together with autocorrelation coefficients for the interference. A G-RAKE receiver may also incorporate techniques introduced in U.S. Pat. No. 6,363,104 to G. E. Bottomley entitled, "Method and apparatus for interference cancellation in a RAKE receiver," filed Oct. 2, 1998; U.S. Pat. No. 6,714,585 to Wang et al. entitled, "RAKE combining methods and apparatus using weighting factors derived from knowledge of spread spectrum signal characteristics," filed Jun. 25, 1999; U.S. Pat. No. 6,683,924 to Ottosson et al. entitled, "Apparatus and methods for selective correlation timing in RAKE receivers," filed Oct. 19, 1999; and U.S. Pat. No. 6,922,434 to Wang et al. entitled, "Apparatus and methods for finger delay selection in RAKE receivers," filed Apr. 30, 2001. The G-RAKE may use strategies for finger placement and combining weight design that suppress interference. The weights may be determined based on channel estimates and an estimate of the overall noise correlation matrix across fingers. Another example of a demodulator is the multi-stage RAKE introduced in U.S. Pat. No. 6,801,565 to Bottomley et al. entitled, "Multi-stage RAKE combining methods and apparatus," filed Jun. 25, 1999.

In wideband CDMA (W-CDMA) systems under current development in Japan and Europe, trade-offs between the amount of transmitter power devoted to sending pilot codes or symbols to facilitate channel estimation and the amount of transmitter power devoted to transmitting user data often result in channel estimation error. A consequence of such error may be uncertainty as to which of a G-RAKE, traditional RAKE or other method of combining despread values is optimum.

U.S. Pat. Nos. 5,557,645 and 5,619,513 to Dent describe that the number of states in a maximum least square estimation (MLSE) equalizer can be expanded beyond the number needed to deal with the multipath channel memory in order to accommodate more estimates of the multipath channel coefficients. U.S. Pat. No. 6,520,910 to Bottomley et al., entitled "Baseband processor with look-ahead parameter estimation capabilities" and filed Oct. 25, 1999, describes that the number of states in a Viterbi MLSE equalizer can be further expanded to encompass extra channel estimates based on hypotheses of future symbols to be decoded.

U.S. Pat. No. 5,230,003 to Dent et al. describes decoding techniques for distinguishing between differently coded data symbols, based on a decoding quality indicator for decoding with each type of code. U.S. Pat. No. 5,841,816 to Croft et al. describes selecting demodulation techniques from a repertoire of demodulation algorithms including diversity combining algorithms using multiple antennas and receivers, non-diversity techniques using a single antenna and receiver, coherent and non-coherent techniques, techniques employing equalizers to compensate for multipath propagation and techniques not involving equalizers, and forward-time, backward-time and mixed bidirectional demodulation algorithms. According to these proposed techniques, the selection of the appropriate algorithm for demodulating is made based on some measurable characteristic of the signal, in particular, on the quality or signal-to-noise ratio of channel estimates made with the help of known signal patterns embedded in the signal. Correlations between different patterns of the measurable characteristics and the choice of algorithm that, on average, provides the best decoding for each pattern may be determined off line by simulation during design and then built into equipment. The optimum demodulation algorithm may then be selected based on the observed pattern of measurable signal characteristics for each instance of demodulation.

Unfortunately, according to such an approach, it may happen that selection of an demodulation algorithm is non-optimum for a given instant, even if the selection was optimum on average. This may occur, for example, when the measured signal characteristics are not indicative of the best instantaneous choice of algorithm.

SUMMARY OF THE INVENTION

According to embodiments of the present invention, a spread spectrum signal is processed by correlating the spread spectrum signal with a spreading sequence at a first plurality of correlation times to produce a first plurality of time-offset correlations. The first plurality of time-offset correlations is processed to produce a first symbol representation for a symbol. A first quality is determined for the first symbol representation. Responsive to the determined first quality, it is determined whether to further process the first symbol representation or to process a second symbol representation for the symbol generated from the spread spectrum signal. Methods, systems and receiver apparatus are provided.

BRIEF DESCRIPTION OF THE DRAWINGS

FIG. 10 illustrates a deinterleaving pattern according to embodiments at the present invention.

FIG. 11 illustrates exemplary decoding operations according to embodiments of the present invention.

DETAILED DESCRIPTION

Figure 1:
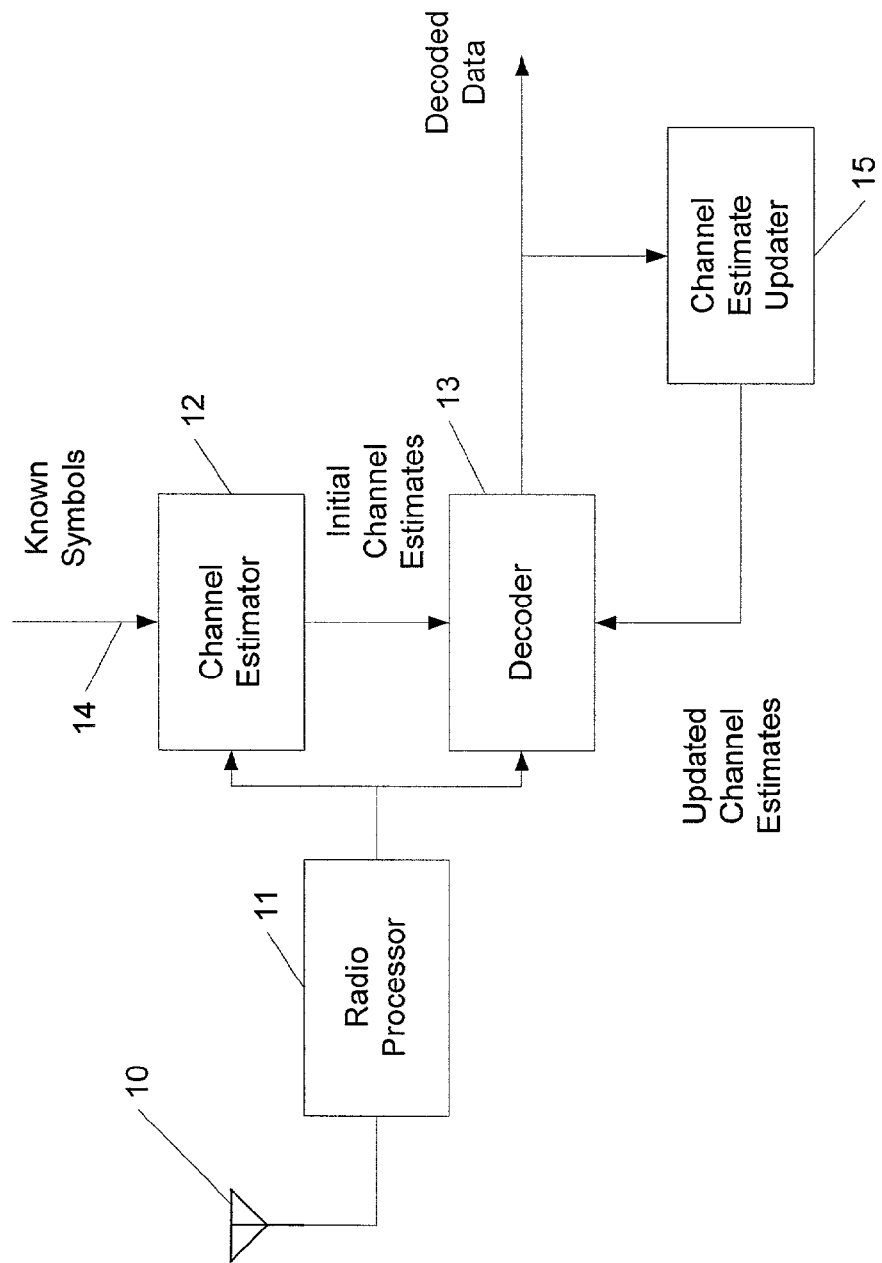
FIG. 1 illustrates a receiver apparatus according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The first quality may be determined in a number of ways, including by decoding the first symbol representations to generate a decoding metric or error check indicator, such as a CRC result. The first and second symbol representations may be generated in a serial fashion, e.g., by determining the first quality before generation of the second symbol representation. The first and second symbol representations may also be generated and/or evaluated for quality in a parallel fashion.

In some embodiments of the present invention, a spread spectrum signal is correlated with a spreading sequence at a first plurality of correlation times to produce a first plurality of time-offset correlations. The first plurality of time-offset correlations is processed to produce a first symbol representation for a symbol. A first quality for the first symbol representation is determined and, responsive to the determined first quality failing to meet a predetermined criterion, a second plurality of time-offset correlations of the spread spectrum signal with the spreading sequence are processed to produce a second symbol representation for the symbol.

In other embodiments of the present invention, a spread spectrum signal is correlated with a spreading sequence at respective first and second pluralities of correlation times to produce respective first and second pluralities of time-offset correlations. Respective ones of the first and second pluralities of time-offset correlations are processed to produce respective first and second symbol representations for a symbol. A least one quality for at least one of the first and second symbol representations is determined and, responsive to the determined at least one quality, it is determined whether to further process one of the first symbol representation or the second symbol representation.

In still other embodiments of the present invention, a spread spectrum signal is demodulated according to a first demodulation process to generate a first symbol representation for a symbol. A first quality for the first symbol representation is determined and, responsive to the determined first quality, it is determined whether to further process the first symbol representation or to process a second symbol representation for the symbol that is generated from the spread spectrum signal according to a second demodulation process. For example, the first and second demodulation processes may comprise respective RAKE and generalized RAKE (G-RAKE) demodulation processes that provide respective performance characteristics that are preferable for respective interference environments, for example, environments dominated by other-cell and own-cell interference, respectively.

In embodiments according to yet other aspects of the present invention, a communications signal, e.g., a spread spectrum signal or a non-spread spectrum signal, is demodulated according to respective first and second demodulation processes to produce respective first and second symbol representations of a symbol. A first one of the first and second symbol representations is decoded to determine a quality for the first one of the first and second symbol representations. Responsive to the determined quality, it is determined whether to further process the first symbol representation or to decode the second symbol representation. The order of decoding may be adaptively selected, e.g., based on a prior decoding history or other parameters.

In the present application, FIGS. 2-11 are schematic diagrams and flowcharts illustrating exemplary communications apparatus and operations according to embodiments of the present invention. It will be understood that blocks of the schematic diagrams and flowcharts, and combinations of blocks therein, may be implemented using one or more electronic circuits, such as circuits included in a wireless terminal or in a wireless communications system (e.g., in a cellular base station or other device), or circuitry used in other types of wireless, wireline, optical and other communications systems. It will also be appreciated that, in general, blocks of the schematic diagrams and flowcharts, and combinations of blocks therein, may be implemented in one or more electronic circuits, such as in one or more discrete electronic components, one or more integrated circuits (ICs) and/or one or more application specific integrated circuits (ASICs), as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the operations specified in the block or blocks. The computer program instructions may also be executed on a computer or other data processing apparatus to cause a series of operations to be performed on the computer or other programmable apparatus to produce a computer implemented process such that the instructions which execute on the computer or other programmable apparatus provide operations for implementing the operation specified in the block or blocks. Accordingly, blocks of the schematic diagrams and flowcharts support electronic circuits and other means that perform the specified operations, as well as acts for performing the specified operations.

It will also be appreciated that the apparatus and operations illustrated in FIGS. 2-11 may be implemented in a variety of communications environments, including wireless, wireline and optical communications environments. For example, the communications apparatus and operations illustrated in FIGS. 2-11 may be embodied in a wireless terminal, a wireless base station, a wireline communications device, an optical communications device, or other communications apparatus. It will be appreciated that the processing apparatus and operations illustrated in FIGS. 2-11 may be combined with other apparatus and operations (not shown), including additional signal processing apparatus (e.g., circuits that provide such capabilities) and operations.

If a receiver is in an interference environment dominated at some times by other-cell interference and at other times by own-cell interference, success of the techniques described in the aforementioned U.S. Pat. No. 5,572,552 may depend upon detecting the difference in these environments. This may be done by comparing channel coefficients for the wanted signal with channel coefficients for interfering signals. However, because channel coefficients may not be perfectly estimated in a noisy environment, doubt may arise as to whether the interference environment is correctly categorized. If a noise covariance is estimated instead of interfering channel coefficients, the noise covariance may also be noisy.

Embodiments of the present invention may overcome such doubt by using multiple demodulators designed to operate assuming different interference categories, and by selecting data from the demodulator having an output which is deemed less erroneous by an error detection check or other quality measure. Other embodiments of the invention use a demodulator that decodes some data symbols using a first assumption of the interference environment and other symbols using a second assumption, the assumption being associated to the symbols in such a way as to optimize a decoding quality criterion, such as a cumulative error metric.

Figure 2:
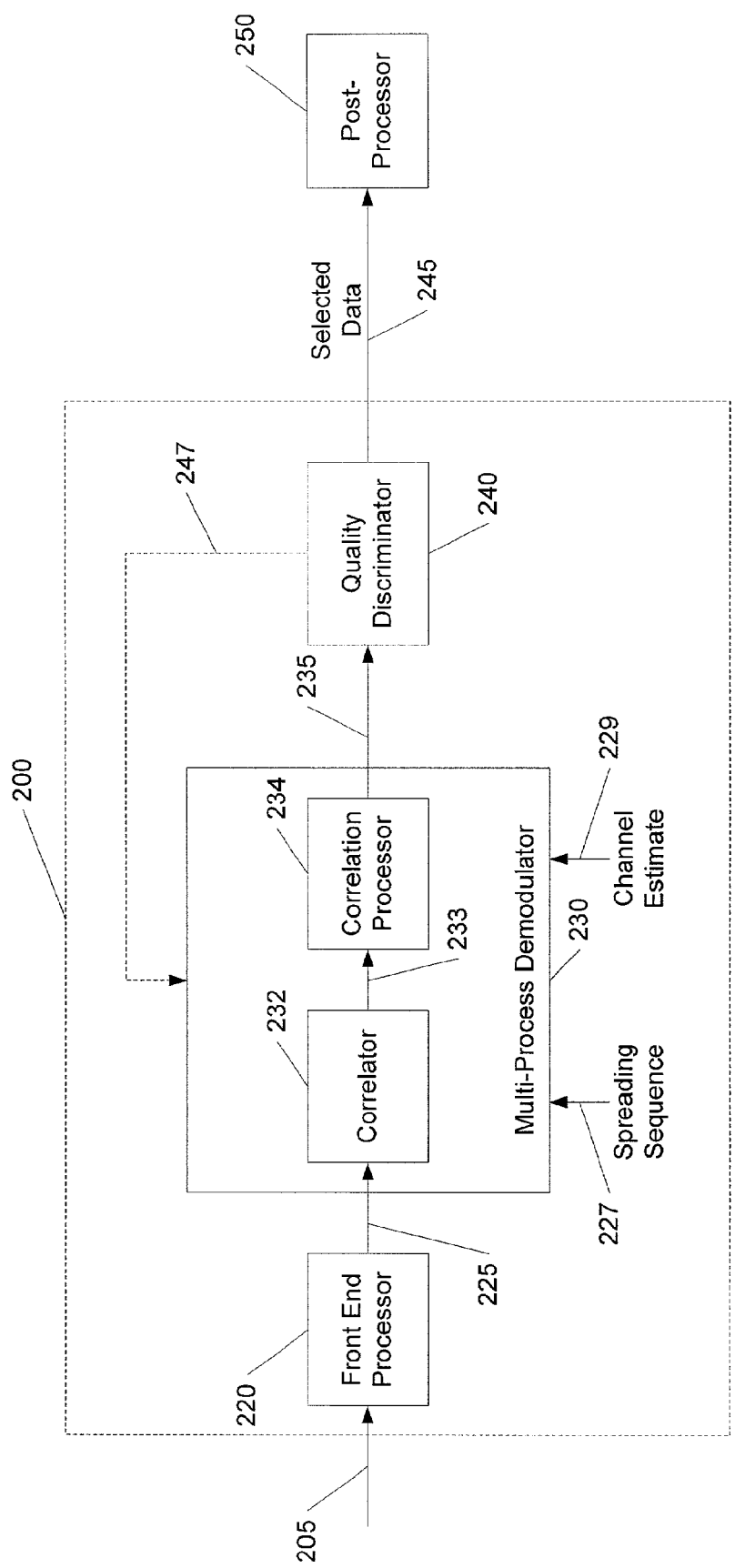
FIG. 2 illustrates a receiver apparatus and methods according to embodiments of the present invention.

FIG. 2 illustrates a receiver 200 according to embodiments of the present invention. The receiver 200 includes a front-end processor circuit 220, a multiprocess demodulator 230, and a quality discriminator circuit 240. A signal 205, e.g., a radio signal received over a radio, wireline, optical or other communications medium, is amplified, filtered, downconverted and digitized by the front-end processor circuit 220 to obtain signal samples 225. The multi-process demodulator 230 generates symbol representations 235 from the signal samples 225 based on a spreading sequence 227 and a channel estimate 229.

As shown, the multi-process demodulator 230 includes a correlator circuit 232 that receives the signal samples 225 and correlates the signal samples 225 with the spreading sequence 227, e.g., the spreading sequence assigned to the receiver 200, to produce time offset correlations 233. The correlation times used by the correlator circuit 232 may be determined based on a channel estimate 229 and, in some embodiments, based on the spreading sequence 227 and additional information relating to interfering signals that may be present in the received signal 205.

The correlations 233 are passed to a correlation processor circuit 234 that processes the correlations 233 to produce the symbol representations 235. For example, the correlation processor circuit 234 may combine the correlations 235 according to a RAKE technique or a G-RAKE technique, using combining weighting factors that are selected based on the channel estimate 229 and, in some embodiments, based on the spreading sequence 227 and information about interfering signals.

The quality discriminator circuit 240 receives the symbol representations 235 and is operative to determine a respective quality for a respective one of the symbol representations 235 and to selectively output symbol representation data 245 based on the determined quality. The output data 245 may be passed on to a post processor circuit 250, e.g., voice decoding or other processing circuitry, for further processing. For example, the quality discriminator circuit 240 may generate quality indicators 247 that are indicative of a quality of the symbol representations 235 produced by the multi-process demodulator 230. The multi-process demodulator 230 may be responsive to the quality indicators 247 to control, for example, the type of correlations 233 produced by the correlator circuit 232 and the type of correlation processing applied by the correlation processor circuit 234. For example, as described in detail below, the quality indicators 247 may be used to control sequential application of different demodulation processes applied by the multi-process demodulator 230.

It will be appreciated that the receiver 200 of FIG. 2 may be implemented in a number of different ways. In general, the multi-process demodulator circuit 230 and the quality discriminator circuit 240 may be implemented using special purpose circuitry, general purpose data processing circuitry that may be configured to perform specific operations using firmware and/or software, and combinations thereof. For example, the multi-process demodulator circuit 230 and/or the quality discriminator circuit 240 may be implemented using a programmable data processing device, such as a microprocessor or digital signal processor (DSP), executing software or firmware that configures the data processing device to perform the operations thereof.

Figure 3:
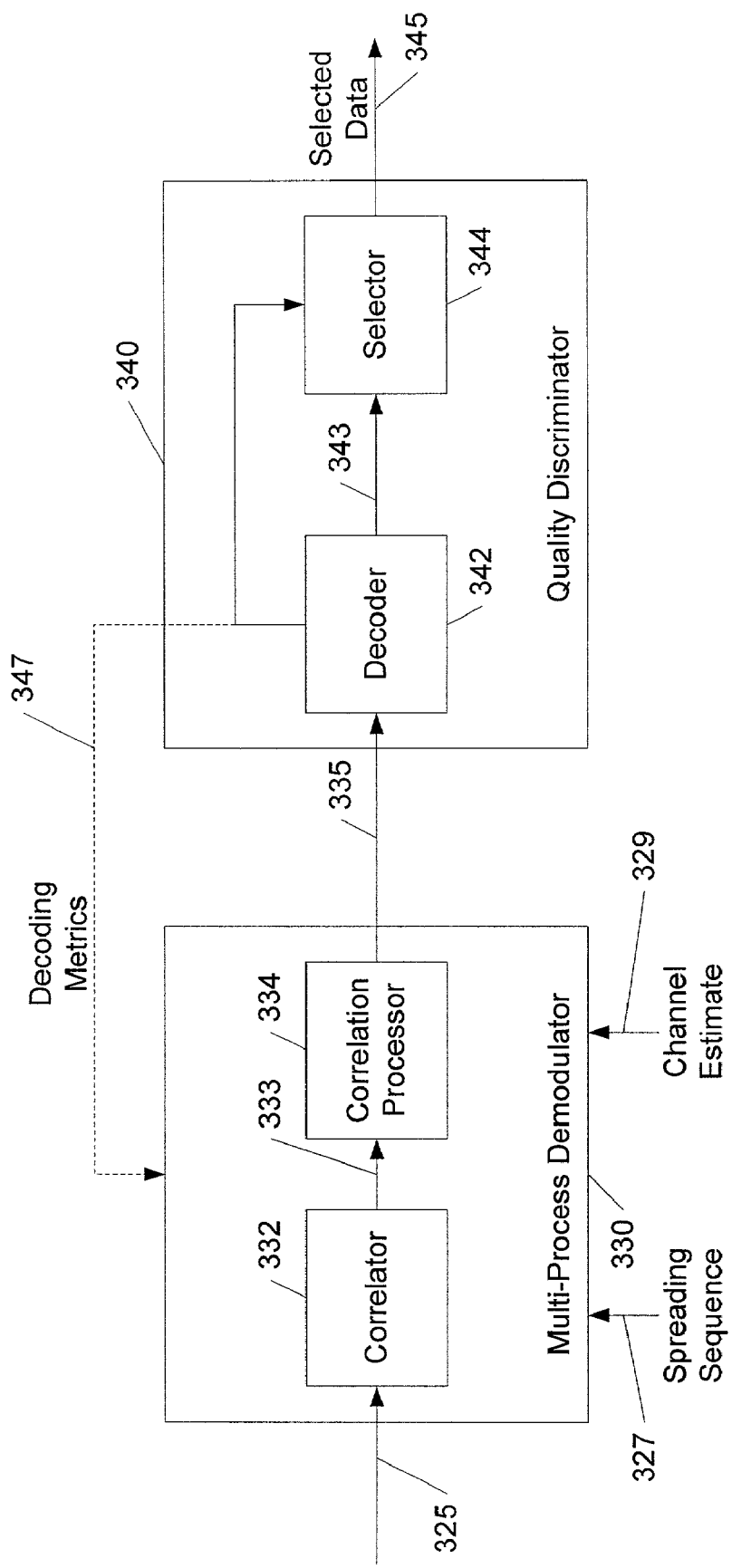
FIG. 3 illustrates a multi-process demodulator circuit and a quality discriminator circuit according to embodiments of the present invention.

FIG. 3 illustrates a combination of a multi-process demodulator 330 and quality discriminator 340 according to embodiments of the present invention. The multi-process demodulator 330 includes a correlator circuit 332 that correlates signal samples 325 with a spreading sequence 327 to produce time-offset correlations 333. The correlator circuit 332 is operative to use correlation times that correspond to multiple different demodulation techniques, e.g., RAKE and G-RAKE. For example, the correlator circuit may be operative to use correlation times determined based on a channel estimate 329, as in traditional RAKE processing, as well as correlation times that are determined based on the channel estimate 329 and information relating to interfering signals as in G-RAKE processing. The correlator circuit 332 may select correlation times used for a particular signal sample responsive to quality indicators that comprise decoding metrics 347 produced by a decoder circuit 342 of the quality discriminator circuit 340.

The demodulator 330 also includes a correlation processor circuit 334 that processes the correlations 333 to produce symbol representations 335. Similar to the correlator circuit 332, the correlation processor circuit 334 is operative to implement multiple correlation processing techniques, for example, RAKE combining and G-RAKE combining techniques. The particular correlation processing applied to a particular correlation may be selected responsive to the quality-indicating decoding metrics 347.

The quality discriminator circuit 340 includes a decoder 342, such as a forward error correction decoder. The decoder 342 decodes the symbol representations 335 produced by the multi-process demodulator 330, producing decoded data 343 and associated decoding metrics 347 that are indicative of the quality of the decoded data 343. The decoded data 343 is passed to a selector circuit 344, which passes selected data 345 of the decoded data 343 based on the decoding metrics.

Figure 4:
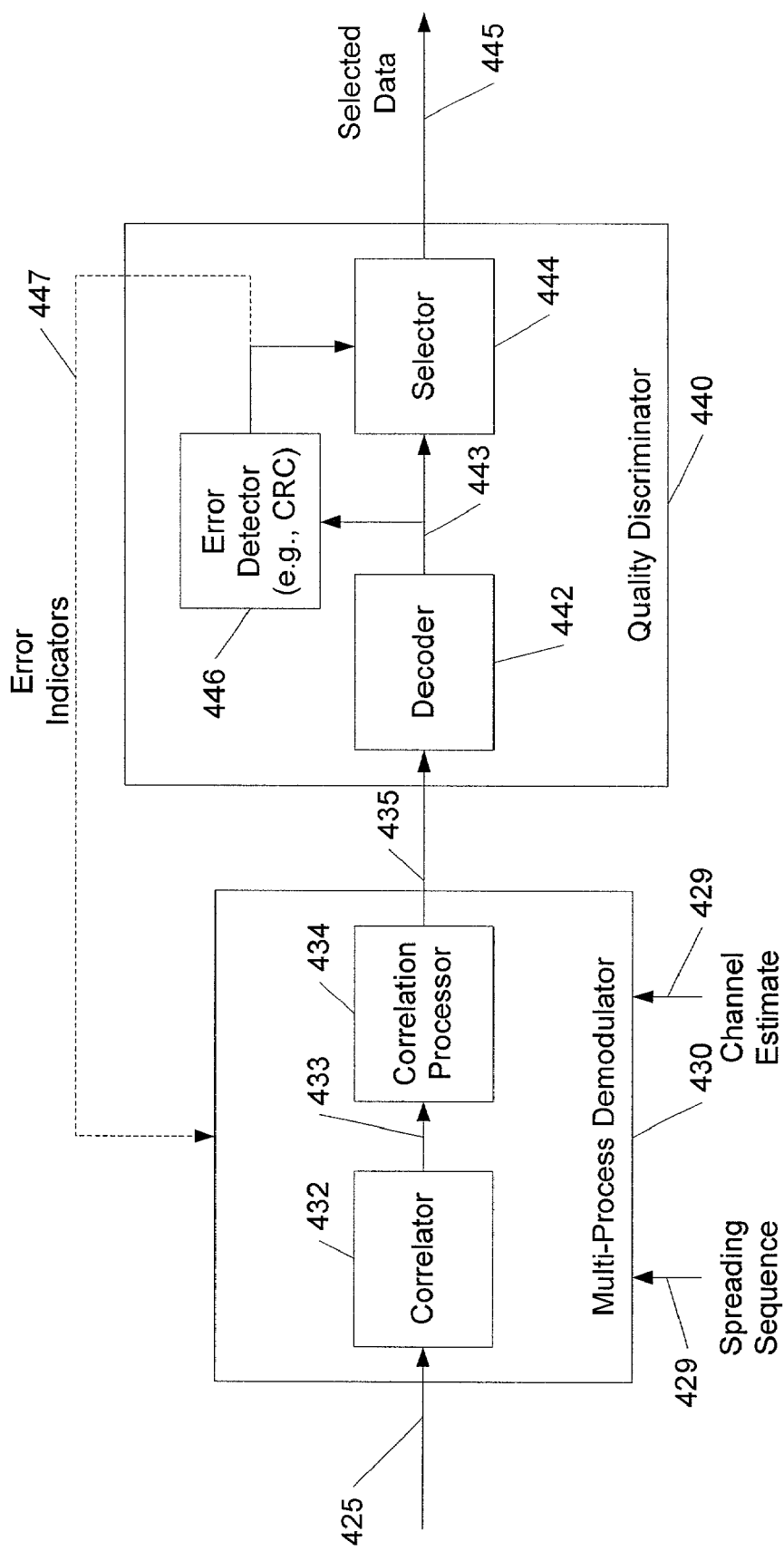
FIG. 4 illustrates a multi-process demodulator circuit and a quality discriminator circuit according to other embodiments of the present invention.

FIG. 4 illustrates a combination of a multi-process demodulator 430 and quality discriminator 440 according to embodiments of the present invention. The multi-process demodulator 430 includes a correlator circuit 432 that correlates signal samples 425 with a spreading sequence 427 to produce time-offset correlations 433. The correlator circuit 432 is operative to use correlation times that correspond to multiple different demodulation techniques. For example, the correlator circuit 432 may be operative to use correlation times determined based on a channel estimate 429, as in traditional RAKE processing, as well as correlation times that are determined based on the channel estimate 429 and information relating to interfering signals, as in some G-RAKE processing techniques. The correlator circuit 432 may select correlations times used to process a particular signal sample responsive to quality indicators that comprise error indicators 447 produced by an error detector circuit 446 of the quality discriminator circuit 440. The time-offset correlations may be stored in memory for processing by different processing methods.

The demodulator 430 also includes a correlation processor circuit 434 that processes the correlations 433 to produce symbol representations 435. Similar to the correlator circuit 432, the correlation processor circuit 434 is operative to implement multiple correlation processing techniques, for example, RAKE combining and G-RAKE combining techniques. The particular correlation processing applied may be selected responsive to the quality-indicating error indicators 447. Also, both RAKE and G-RAKE combining may be applied, and the resulting symbol representations may be stored in memory.

The quality discriminator circuit 440 includes a decoder 442, e.g., a forward error correction (FEC) decoder. The decoder 442 decodes the received symbol representations 435, producing decoded data 443. The decoded data 443 is processed by the error detector circuit 446, which produces the error indicators 447, e.g., indicators that indicate whether an error check is successful. The error detector circuit 446 may comprise, for example, a circuit that performs an error detection decoding process such as a cyclic redundancy check (CRC) or a Reed-Solomon decoding. The decoded data 443 is also passed to a selector circuit 444, which passes selected data 445 of the decoded data 443 based on the error indicators 447. Alternatively, the decoded data can be re-encoded and compared to the modem bit values to provide an error check.

Referring again to FIG. 2 (as well as to embodiments illustrated in FIGS. 3 and 4), a receiver 200 according to embodiments of the invention described herein may implement operations of a multi-process demodulator 230 and the quality discriminator circuit 240 in various ways, including parallel implementations, serial implementations, and hybrid parallel/serial implementations. For example, the correlator circuit 232 and the correlation processor circuit 234 may be operative to process signal samples to implement multiple demodulation processes, for example, RAKE processes, G-RAKE processes and variations thereof, to produce symbol representations for a given symbol in parallel or serial fashions. Similarly, the quality discriminator circuit 240 may be operative process the symbol representations produced by the various demodulation techniques in parallel or serial fashions.

Figure 5A:
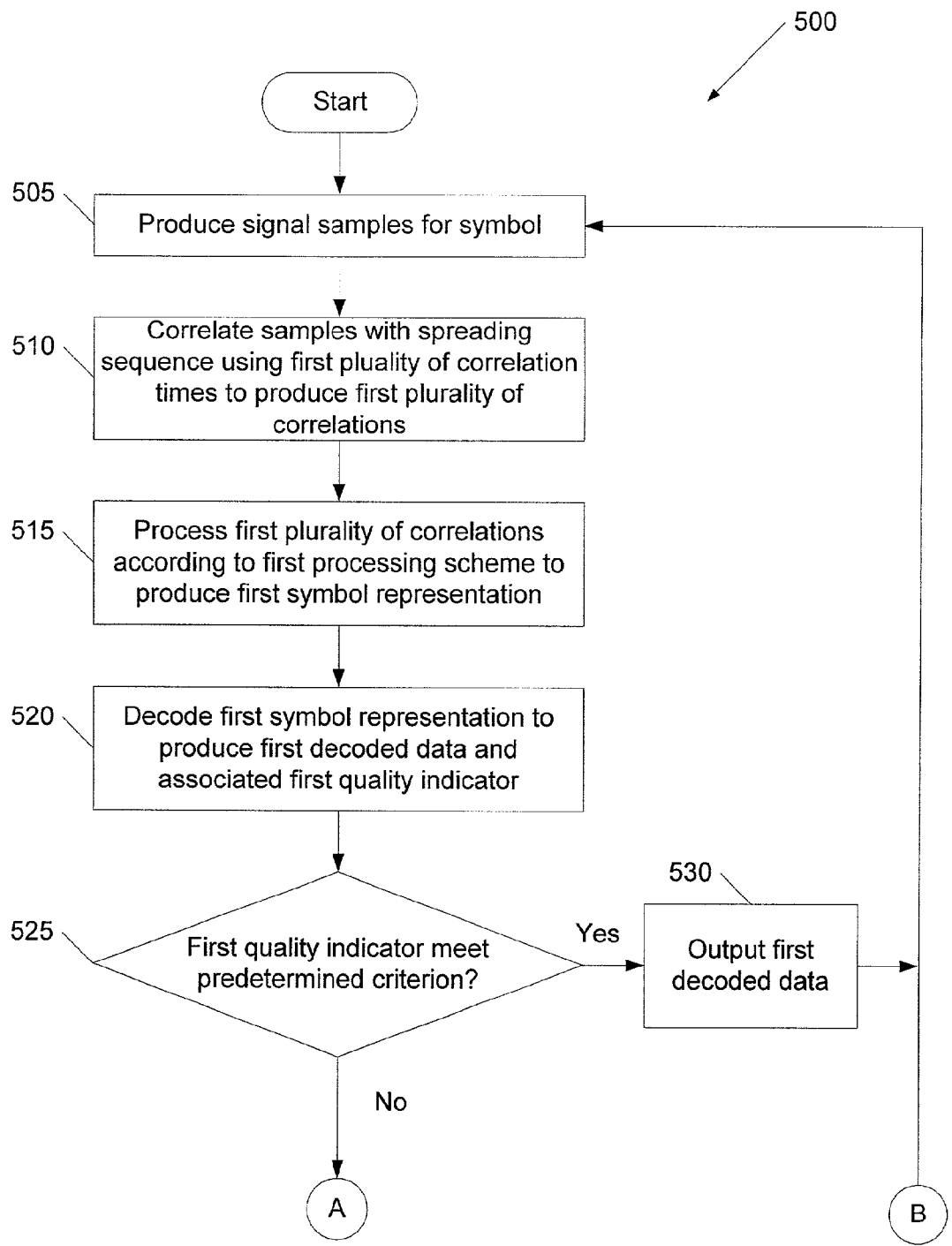
FIGS. 5A-5B illustrate exemplary operations for processing a communications signal according to embodiments of the present invention.
Figure 5B:
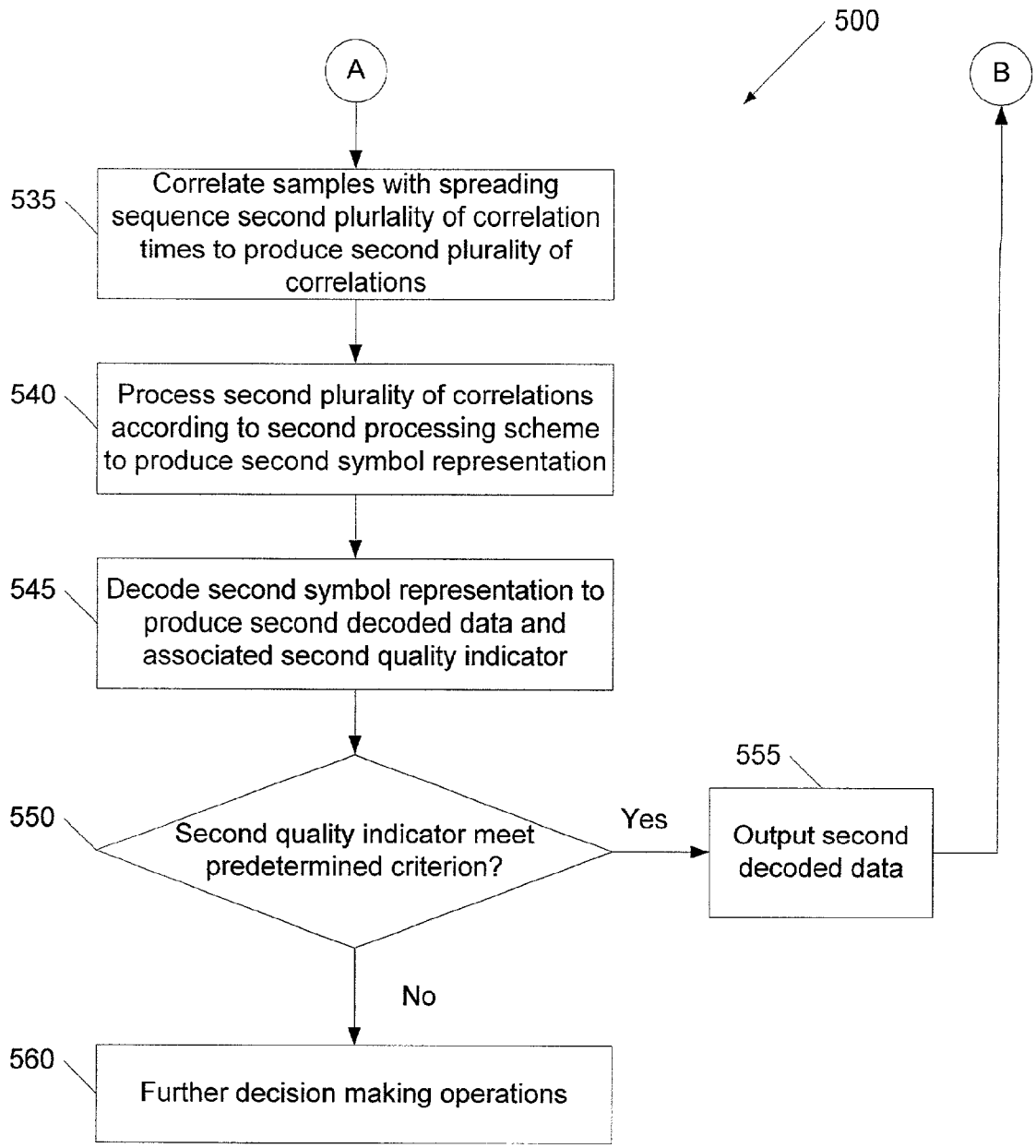

FIGS. 5A-5B illustrate exemplary operations 500 for performing sequential processing according to different demodulation processes, e.g., RAKE and G-RAKE processes, according to various embodiments of the present invention. Signal samples for a symbol are produced (Block 505). For a first pass through the multiprocess demodulator 230, the correlator circuit 232 and the correlation processor circuit 234 are configured to implement a first demodulation process. The signal samples are correlated using a first set of correlation times or "taps" that are associated with the first demodulation process (Block 510). The first set of correlations thus produced is then processed according to a first correlation processing scheme to produce a first symbol representation, e.g., a decision statistic for the symbol in question (Block 515). The first symbol representation is then decoded, e.g., error correction decoded, to produce first decoded data and an associated first quality error indicator, such as a decoding metric or CRC check result (Block 520). If the first quality indicator meets a predetermined criterion, e.g., indicates an acceptable error level, the decoded data is output for further processing (Blocks 525, 530).

If not, the multi-process demodulator 230 is configured for a second pass to provide a second demodulation process. As shown in FIG. 5B, the signal samples for the symbol are correlated using a second set of correlation times associated with the second demodulation process, thus producing a second set of correlations (Blocks 525, 535). The second set of correlations is processed to produce a second symbol representation (Block 540). The second symbol representation is then decoded to produce second decoded data and an associated second quality indicator (Block 545). If the second quality indicator meets a predetermined criterion, the second decoded data is output for further processing (Block 550, 555). If not, further decision-making operations may be performed (Block 560). For example, one of the first decoded data or the second decoded data could be selected based on a comparison of the first and second quality indicators, or a third demodulation process, i.e., one other than the first and second processes described above, may be tried to produce decoded data with an acceptable quality.

Figure 6:
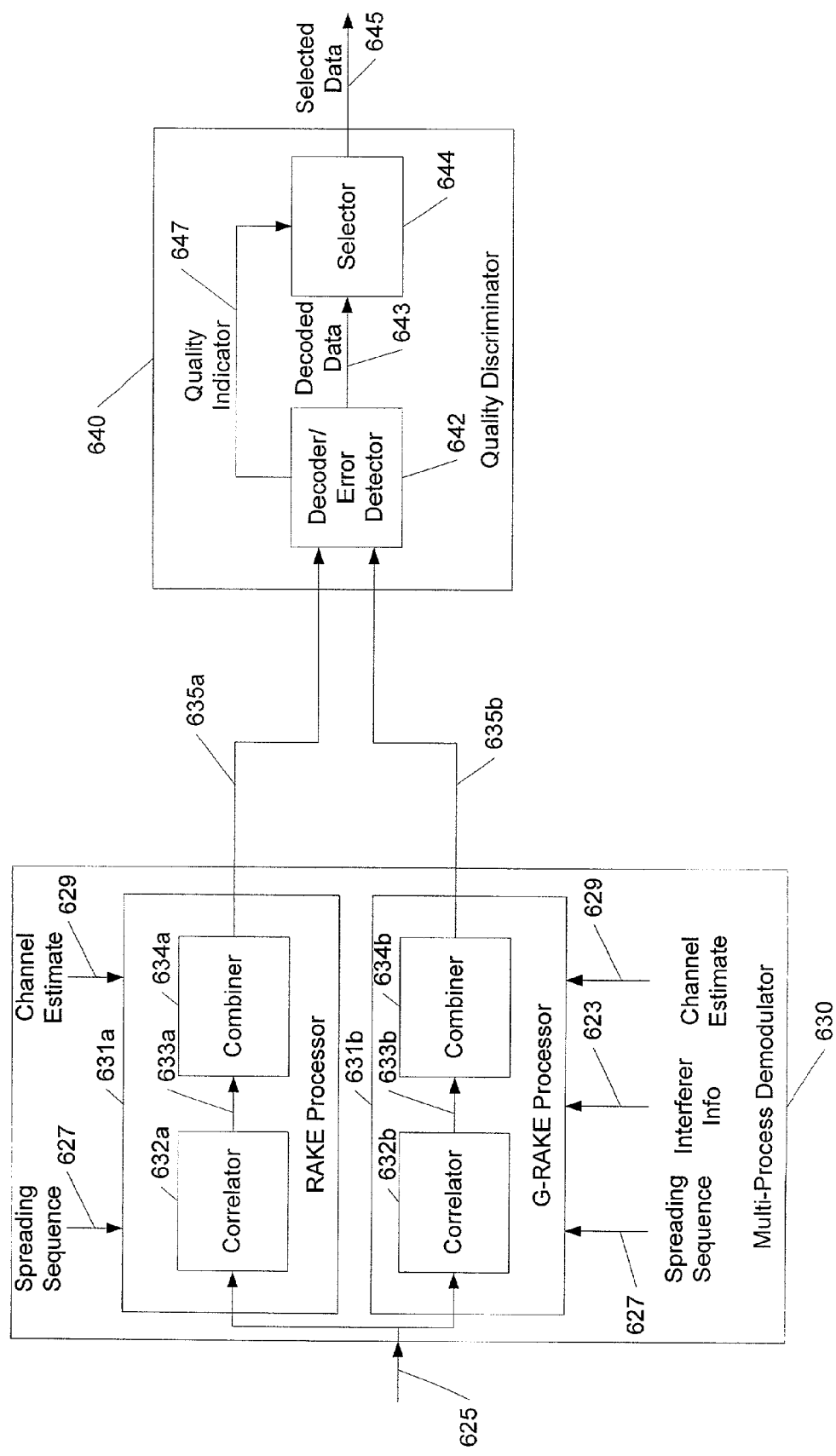
FIG. 6 illustrates a multi-process demodulator circuit and a quality discriminator circuit according to still other embodiments of the present invention.

It will be appreciated that the operations described with reference to FIGS. 5A and 5B are offered for purposes of illustration, and that many modifications of these operations fall within the scope of the present invention. It will be further understood that sequential demodulation/decoding according to embodiments of the present invention may be implemented using a number of different processing configurations. For example, the first and second demodulation/decoding passes described above may be implemented using parallel processing structures that implement respective ones of the first and second processes described, respective ones of which are selected to perform respective ones of the first and second passes. Alternatively, a shared processing structure may be used that is configurable to implement the different processing schemes. For example, a correlator circuit 232 of FIG. 2 may be operative to generate correlations for both of the first and second processes in a single process. The correlations thus produced may be selectively processed, e.g., RAKE or G-RAKE combined, depending on whether the first or second correlation processing technique is desired. The correlation processor circuit 234 may comprise a generic correlation processing structure that uses correlation inputs and parameters, such as combining weighting factors that are selected based on the particular type of correlation processing desired. In other embodiments, the correlator circuit 232 and the correlation processor circuit 234 may generate the first and second symbol representations according to the first and second demodulation processes before decoding either of the first and second symbol representations to determine an associated quality FIG. 6 illustrates a parallel-structured multi-process demodulator 630 and associated quality discriminator circuit 640 that may be used to implement the latter technique according to embodiments of the present invention. The multi-process demodulator 630 includes a RAKE processor circuit 631a that includes a RAKE correlator circuit 632a and a RAKE combiner circuit 634a. The RAKE correlator circuit 632a correlates one or more signal samples associated with a symbol with a spreading sequence 627 at correlation times that are selected based on a channel estimate 629, producing first time offset correlations 633a. The first time-offset correlations 633a are combined by the RAKE combiner circuit 634a using combining weighting factors that are based on the channel estimate 629, producing a first representation 635a of a symbol. It will be appreciated that the RAKE processor circuit 631a may comprise any of a number of conventional RAKE processor circuit structures, the operations of which are known to those skilled in the art and will not be discussed in detail.

The multi-process demodulator 630 also includes a G-RAKE processor circuit 631b. The G-RAKE processor circuit 631b includes a G-RAKE correlator circuit 632b that correlates the one or more signal samples 625 with the spreading sequence 627 at correlation times that are selected based on the channel estimate 629 and information 623 on one or more interferer signals present in the signal represented by the one or more signal samples 625. The G-RAKE correlator circuit 632b produces second time-offset correlations 633b that are combined by a G-RAKE combiner circuit 634b that combines the second time-offset correlations 633b according to combining weighting factors that are determined based on the spreading sequence 627, the channel estimate 629 and the interferer information 623, producing a second representation 635b of the symbol. Examples of G-RAKE processor circuit structures and operations that may be used with the present invention are described in U.S. Pat. No. 6,714,585 to Wang et al. entitled, "RAKE combining methods and apparatus using weighting factors derived from knowledge of spread spectrum signal characteristics," filed Jun. 25, 1999 and in U.S. Pat. No. 6,363,104 to G. E. Bottomley entitled, "Method and apparatus for interference cancellation in a RAKE receiver," filed Oct. 2, 1998.

The stored first and second symbol representations 635a, 635b are selectively processed by a decoder/quality indicator circuit 642 of the quality discriminator circuit 640, which is operative to produce decoded data 643, e.g., forward error correction decoded data, and associated quality indicators 647, e.g., decoding or CRC metrics. A selector circuit 644 selects data 645 from the decoded data 643 based on the quality indicators 647. For example, the selected data 645 may comprise data of the decoded data 643 that has an associated quality indicator 647 meeting a predetermined criteria, for example, a least error as indicated by a decoding metric comparison and/or a error detection indicator such as a CRC check result.

The quality discriminator circuit 640 may process the stored first and second symbol representations 635a, 635b in a sequential fashion. For example, the decoder/error detector circuit 642 may retrieve a first one of the stored symbol representations 635a, 635b, producing first decoded data and an associated first quality indicator. This first decoded data may be passed on by the selector circuit 644 if its associated first quality indicator meets a predetermined criterion. If it does not, the decoder/error detector circuit 642 may retrieve a second one of the stored symbol representations 635a, 635b and decode it to produce second decoded data and an associated second quality indicator.

In other embodiments of the present invention, the quality discriminator circuit 640 may process the stored first and second symbol representations 635a, 635b in a parallel fashion. The decoder/error detector circuit 642 may concurrently process the first and second symbol representations 635a, 635b to produce first and second decoded data and associated first and second quality indicators. The selector circuit 644 may then select one of the first and second decoded data sets having the most acceptable associated quality indicator.

Because the RAKE and G-RAKE correlator circuits 632a, 632b correlate signal samples with a common spreading sequence 627, the apparatus of FIG. 6 may be configured such that a common correlator circuit structure is used to concurrently produce all of the correlations 633a, 633b. These correlations are generally less numerous than the original signal samples. The correlations 633a, 633b may be produced and stored in memory so that the RAKE and G-RAKE combiner circuits 634a, 634b can process them or reprocess them in non-real-time.

The combiner circuits 634a, 634b need not operate simultaneously. For example, the first correlations 633a can first be combined by the RAKE combiner circuit 634a to generate the first symbol representation 635a, which can then be decoded and quality checked by the quality discriminator circuit 640. If the quality check meets a predetermined criterion, it may not be necessary to further process the second correlations 633b. If the decoding and quality check of the first symbol representation is unacceptable, however, the second set of correlations 633a can be G-RAKE combined to generate a second symbol representation 645b, which, in turn, is decoded and quality checked by the quality discriminator 640. It will be appreciated that the order of processing can be reversed, i.e., the second correlations 633b may be G-RAKE combined and decoded first, with the first correlations being combined and decoded if the results of the decoding of the G-RAKE combined correlations is unacceptable.

Figure 7:
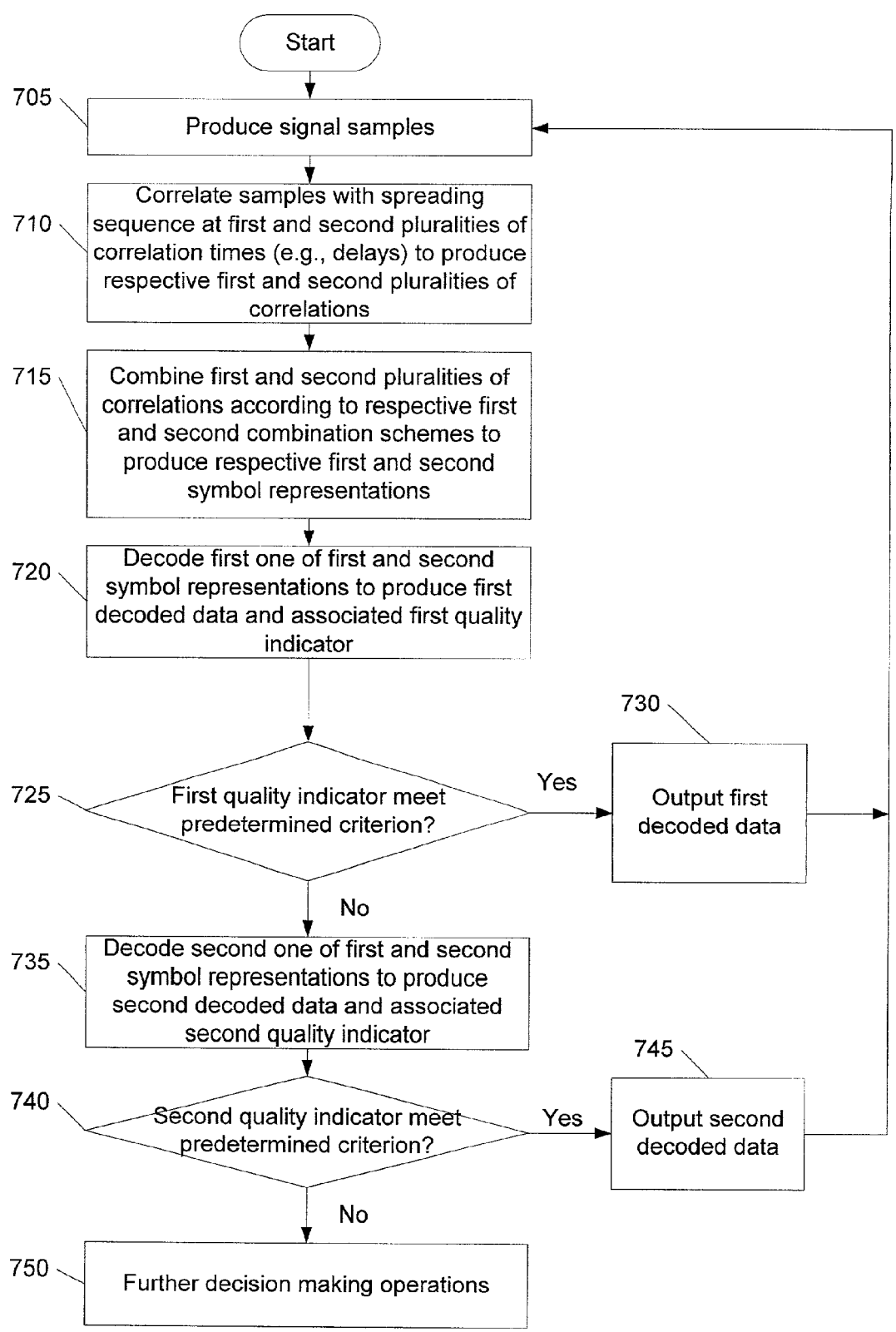
FIG. 7 illustrates exemplary operations for processing a communications signal according to other embodiments of the present invention.

FIG. 7 illustrates exemplary sequential processing operations 700 according to embodiments of the present invention. Signal samples are produced (Block 705) and correlated with a spreading sequence at first and second sets of correlation times to produce respective first and second sets of time-offset correlations (Block 710). These sets usually overlap, having common elements. Respective ones of the first and second sets of correlations are then combined according to respective ones of first and second combination schemes, e.g., RAKE and G-RAKE combination schemes, to produce first and second symbol representations for a symbol (Block 715). A first one of the first and second representations is then decoded to generate first decoded data and an associated first quality indicator (Block 720). If the first quality indicator meets a predetermined criterion, the first decoded data is output for post-processing (Blocks 725, 730). If not, a second one of the first and second symbol representations is decoded to produce second decoded data and an associated second quality indicator (Block 725, 735). If the second quality indicator meets a predetermined criterion, the second decoded data is output for post-processing (Blocks 740, 745). If not, further decision-making operations may be performed (Blocks 740, 750).

An adaptive approach may limit the number of decoding operations that need to be performed on demodulated symbol representations to produce acceptable decoded data. One way this may be achieved is by determining which demodulation technique to try first based on respective performance measures for the respective demodulation processes. For example, first and second symbol representations for a symbol produced by first and second demodulation processes may have soft outputs that indicate a level of confidence in the symbol representations. In some embodiments of the present invention, these soft output values may be averaged over a time interval to provide an estimate of which of the first and second demodulation processes provides a higher average confidence level. The demodulation process having the higher average confidence level may then be selected as the first candidate for decoding. Other such performance metrics include, for example, path metrics generated by maximum likelihood sequence estimation (MLSE) demodulation processes.

In still other embodiments of the present invention, a reduced complexity or partial decoding may be performed on both symbol representations to provide metrics that may indicate which demodulation output is likely to produce a better result. For example, the first and second symbol representations may be syndrome decoded to provide an intermediate estimate of error, with the symbol representation having the best syndrome decoding result being selected for subsequent full error correction decoding. Syndrome decoding is well understood in the context of block codes, for example, as described in *Error Control Coding, Fundamentals and Applications,* by Lin et al. (1983). Important code families for which highly efficient syndrome decoding methods have been designed include BCH codes and RS codes. For convolutional codes, syndrome decoding is typically used more sparingly. One application that incorporates it is the feedback decoding method. In the present invention, syndrome decoding can be used as a means to determine whether a section of a received code sequence is in fact a valid code section (meaning that it is possible for the encoder to produce it). To apply syndrome decoding, hard values may be produced from soft values intended for the decoder. Then the sequence of hard values, or bits, may be partitioned into sub-blocks. The smallest size sub-block that can be used is determined from the structure of the convolutional code. It is advantageous to use that size, denoted L, for the sub-block.

For each sub-block, a linear operation produces a syndrome S, which is a binary vector. If any of the bits in S in non-zero, then the sub-block contains some errors. If all the bits in S are zero, then with very high probability, the sub-block contains no errors, and with very low probability, it contains undetectable errors. The computation of the syndrome is very simple compared to a full-fledged Viterbi decoder. Having applied syndrome decoding to all the sub-blocks in the received code sequence, the number of sub-blocks in error can be counted and used as an indicator of the reliability of the demodulator.

Syndrome decoding can also be used with turbo codes. Each component code of a turbo code is itself a convolutional code. Hence, syndrome decoding can be directly applied to the received sequence intended for each component decoder of the turbo decoder. As with convolutional codes, the number of sub-blocks in error may be used as a reliability indicator. In comparing the reliability of candidate demodulator outputs, e.g., RAKE and G-RAKE, syndrome decoding can be applied to the respective outputs to obtain reliability indicators. The more reliable output may be kept and fed to a full-fledged decoder.

Similarly, partial error correction decoding may be performed on both the first and second symbol representations, and the symbol representation having the best partial decoding result may subsequently be selected for full error correction decoding. For MLSE decoding, a partial decoding metric may be provided by accumulated path metrics. For iterative turbo decoding, a CRC check may be performed after each iteration to determine when to terminate decoding.

In yet other embodiments of the present invention, results from previously demodulated and decoded data blocks (frames) may be used to generate a demodulation performance metric. For example, if a CRC check performed on decoded data produced by one of the first and second demodulation processes for a previously decoded frame is successful, the successfully decoded data can be re-encoded and compared to the outputs of the first and second demodulation processes to generate error estimates (e.g., bit error rate estimates) for each of the first and second demodulation processes. The demodulation process having the best bit error rate estimate may then be selected for first decoding for a current frame.

In other embodiments of the present invention, a performance metric for the demodulation processes may be derived from measures of success in one or more preceding frames. In particular, if a particular demodulation process is successful in one or more preceding frames, that process may be selected for first decoding in the current frame. If none of the demodulation processes was sufficiently successful in the one or more preceding frames, a process that has not recently been used may be selected for first decoding in the current frame. If more than one demodulation process is sufficiently successful in the one or more preceding frames, the successful demodulation process with the least complexity may be chosen for first decoding of the current frame.

Figure 8:
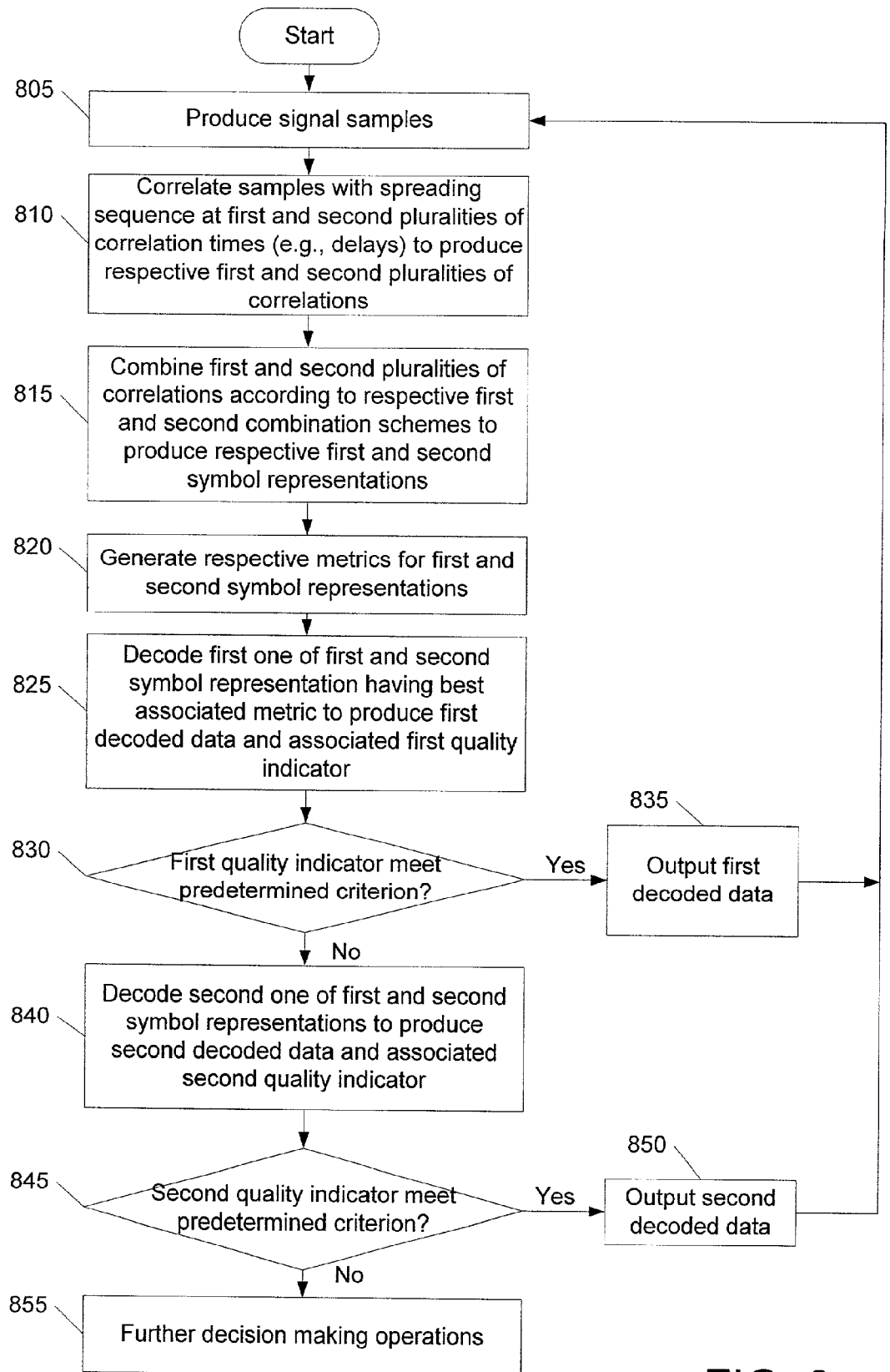
FIG. 8 illustrates exemplary operations for processing a communications signal according to further embodiments of the present invention.

FIG. 8 illustrates exemplary sequential processing operations 800 which use such measures of demodulation quality to adaptively determine decoding order according to embodiments of the present invention. Signal samples are produced (Block 805) and correlated with a spreading sequence at first and second sets of correlation times to produce respective first and second sets of time-offset correlations (Block 810). Respective ones of the first and second sets of correlations are then combined according to respective ones of first and second combination schemes, e.g., RAKE and G-RAKE combination schemes, to produce first and second symbol representations (Block 815). Respective first and second metrics for the first and second symbol representations are then generated (Block 820). A first one of the first and second symbol representations is then selected for decoding based on the respective first and second metrics, and decoded to generate first decoded data and an associated first quality indicator (Block 825). If the first quality indicator meets a predetermined criterion, the first decoded data is output for post-processing (Blocks 830, 835). If not, a second of the first and second symbol representations is decoded to produce second decoded data and an associated second quality indicator (Block 830, 840). If the second quality indicator meets a predetermined criterion, the second decoded data is output for post-processing (Blocks 845, 850). If not, further decision-making operations may be performed (Blocks 845, 855).

With the aforementioned serial processing approaches, demodulation and decoding operations may be minimized if the combination of demodulation and decoding that is most likely to succeed, e.g., most likely to produce a successful CRC check, is tried first. However, because this combination of demodulation and decoding often may be the most complex, there is a tradeoff between the benefit of running a lower complexity demodulation/decoding process first and avoiding having to run a higher complexity demodulation/decoding process, versus the risk of having the lower complexity process fail and force running of the higher complexity process. For example, in typical CDMA systems, a desirable CRC failure rate may be in the 1% to 10% region. If a G-RAKE process operates in this range, a RAKE process, which generally is less complex, may operate in a CRC failure rate range of 2%-20%. Thus, in such an environment it may be preferable to always try the RAKE process first.

Other types of demodulator configurations that may be used with the present invention, in addition to or instead of the already described configurations, include interference subtractive decoders as described for example in U.S. Pat. No. 5,151,919 to Dent entitled "CDMA subtractive demodulation." Another suitable type of interference subtractive decoder is described in U.S. Pat. No. 6,570,910 to Dent entitled, "Baseband Processor with Look-Ahead Parameter Estimation Capabilities," filed Oct. 25, 1999, assigned to the assignee of the present invention and incorporated herein by reference in its entirety. In other embodiments of the present invention, processes implemented by a multi-process demodulator may comprise a first RAKE process that combines correlations for all multipath rays for which a channel estimate is available, and a second RAKE process that combines correlations corresponding only to the strongest multipath rays having a signal strength greater than a predetermined signal strength threshold.

Signal samples generated at a receiver may represent information transmitted over an interval in which the interference environment is not static and may, for example, change from predominantly own-cell interference to predominantly other-cell interference. In addition, a channel may shift between multipath propagation favoring one type of receiver configuration and multipath propagation favoring another type of receiver configuration. In still other cases, a receiver may be uncertain whether its intended data is being transmitted by a first or a second transmitter, or by both (macrodiversity), but at least knows that a change in transmitter configuration only occurs on certain signal boundaries, such as frame or timeslot boundaries.

Figure 9:
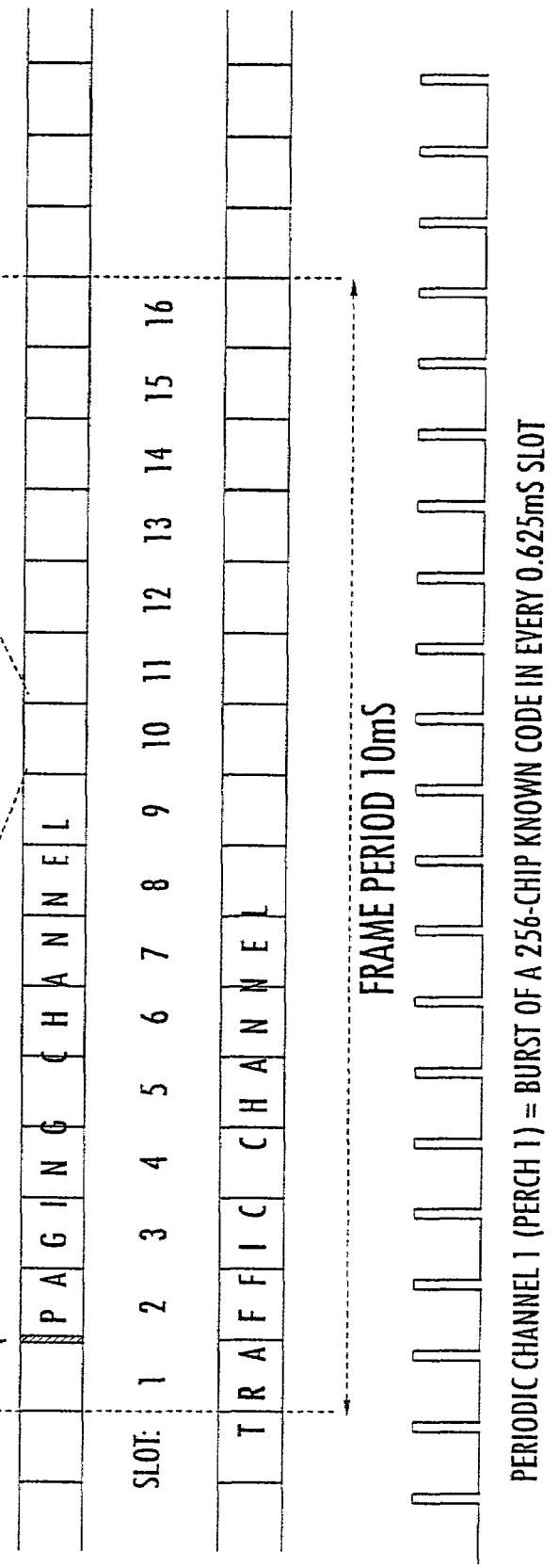
FIG. 9 illustrates an exemplary CDMA signal format.

FIG. 9 illustrates a conventional CDMA signal format having identifiable slot and frame boundaries. A 10 millisecond (msec) frame period is divided into 16 timeslots of 0.625 msec duration. Each slot contains 2560 chips of a CDMA-spread data symbol stream, each symbol being represented by 256 chips, 128 chips, 64 chips or fewer according to the data rate desired. The lowest data rate uses 256:1 spreading giving 256 chips per symbol and 10 symbols per slot. Some of the symbols are known pilot symbols which may be correlated in the receiver to form channel estimates. The lowest data rate may be used to transmit paging or call alert messages to mobile phones, and digital voice transmission may use this lowest data rate or a next highest data rate with 128:1 spreading and 20 symbols per slot. Such digital data is typically assembled into frames or blocks to be transmitted in one 10 msec frame period, and the block of assembled data is typically error correction coded using a convolutional or turbo code to form coded symbols. The coded symbols are then spread over the 16 slots of the frame using interleaving to give protection against fading.

At relative velocities of the order of 60 miles/hour between a receiver and a transmitter transmitting a desired signal, fading can change between one slot and the next. Moreover, the interference from other base stations typically fades in an uncorrelated fashion relative to interference from the base station that transmits the desired signal. Therefore, the interference environment experienced by the receiver can change from slot to slot from own-cell interference dominated to other-cell interference dominated. An ideal receiver would, therefore, switch modes from slot to slot, e.g., between processing methods optimized for the own-cell interference-dominated case and methods optimized for other-cell interference.

One technique for determining which method to use for a slot is to make channel estimates by correlating with known symbols transmitted by both own cell and other cells to thereby determine their relative signal strengths. However, this may only yield the relative strengths of selected signals, such as the paging channel, pilot code or channel for which one particular CDMA access code is correlated, and may not yield information on, for example, how many other CDMA access codes may be active interferers at the same time. To avoid this, a pilot code having power proportional to the sum of all of the signals transmitted by the transmitter could be transmitted, such that a single correlation with the pilot code could yield information on the total interference from a transmitter. In the absence of such specific information, however, it may be difficult to accurately categorize the interference environment for the purposes of choosing the optimum method of signal processing.

According to embodiments of the present invention, such as the embodiments described above with reference to FIG. 6, signal samples for a slot may be correlated and combined according to both a first demodulation process (e.g., a RAKE process optimized for white noise) and a second process (e.g., a G-RAKE process) optimized for colored noise. Then, the symbol representations produced by the first and second processes may be deinterleaved and decoded in respective first and second decoders, and the decoder output with the best quality or error indicator selected for further processing.

For example, in one possible approach according to embodiments of the present invention, all slots in an interleaved frame may be both RAKE processed and G-RAKE processed, i.e., without a slot-by-slot selection. If data in the slots is interleaved in a pattern that threads through all 16 slots in an arbitrarily chosen manner, one type of decoding technique that may be used, albeit of possibly excessive complexity, comprises using $2^{16}$ or 65536 decoders to decode the data using all combinations of the slots being RAKE or G-RAKE combined.

In a second possible approach, the choice of RAKE or G-RAKE processing is provided for each despread soft output. According to such an approach, a constraint length L, rate 1/R convolutional decoder may be used to maintain $2^{(L-1)}$ hypotheses, which is of lower complexity than 65536 decoders for L<16/R+1. For example, for a rate ½ code, the first and second approaches would be equivalent in complexity for constraint length 9, and, for shorter constraint lengths than 9, the second approach is less complex than 65536 decoders. According to the second approach, there is, however, an unnecessary degree of freedom arising from allowing the choice of RAKE or G-RAKE independently, not only for bits taken from the same slot, but even for bits taken from the same symbol.

However, if the second approach is modified such that the choice of RAKE or G-RAKE processing is constrained to be the same for coded bits taken from the same slot, as in the first approach, reduced complexity may be achieved. This can be done by using an interleaving pattern that is chosen such that when the decoder deinterleaves data that is spread over all the timeslots, only the most recently received timeslot or slots are not firmly chosen to be RAKE processed or G-RAKE processed, while other, preceding, time slots are classified such that all their remaining bits are decoded in the previously decided manner.

FIG. 10 illustrates an exemplary slot structure, showing four slots i−3, i−2, i−1, i currently being deinterleaved as well as a subsequent fifth slot i+1. Each of the slots contains eight quadrature phase shifted keying (QPSK) symbols, each having an I bit and a Q bit. A deinterleaving pattern plucks one quarter of the symbols from each of the slots i−3, i−2, i−1, i, and then advances the four-slot pattern by one slot to pluck symbols from a new slot, the symbols from the oldest slot having just been exhausted. Each of the slots i−3, i−2, i−1, i contain 8 symbols represented by the horizontal squares. Each symbol contains two modem bits, i.e., an I bit in the top row of squares and a Q bit in the bottom row. Shaded squares indicate which bits and symbols have already been deinterleaved and decoded. As shown, three-quarters of the symbols in the slot i−3, half of the symbols in the slot i−2 and one quarter of the symbols in the slot i−1 have already been processed. The deinterleaving process plucks the next bit numbered "1" from the slot i, then the bit numbered "2" from the slot i−3, the bit numbered "3" from the slot i−1, the bit number "4" from the slot i−2, and so forth. This deinterleaving pattern continues by taking successive bits as far as possible from regions that are as different as possible in ways such as: being as far away in time as possible from the previous bit; being an I bit if the previous bit was a Q bit; or being a bit from the right hand end of a slot moving towards the middle if the previous bit was to the left of the middle of a slot. Thus, after taking bits 1 to 16 from the four slots i, (i−i), (i−2), (i−3), slot (i−3) is exhausted, the usage of bits from slot (i−2) has increased from ½ to ¾; the usage of bits from slot (i−i) has increased from ¼ to ½, and ¼ of the bits in slot (i) have been used. The deinterleaving is now ready to progress to the next slot (i+1).

According to embodiments of the present invention, the processing technique applied to bits of a slot can be chosen such that a demodulation process (e.g., RAKE or G-RAKE) that has been selected for a predetermined number of bits of a slot, e.g., ¼ of the bits, continues to be used for other bits of the slot that are subsequently processed. Thus, for the slot structure of FIG. 10, uncertainty as to the type of demodulation process to be used exists only for slot (i) while bits 1, 5, 9 and 13 are being processed, but the remaining bits of slots (i−1), (i−2) and (i−3) are processed using previously chosen processes. The previously chosen processes, however, can be different for each Viterbi state and can follow the decoding path when a state is selected to be the predecessor to an extended decoding path.

Because no process is preferred for slot (i) during the processing of bits 1, 5, 9 and 13, all or some of the available processes (e.g., both RAKE and G-RAKE) may be tried for those bits, giving rise to the use of at least two decoders in parallel (that is twice the number of Viterbi states in total) during that time. After processing bits 1, 5, 9 and 13, two sets of decoder states will exist, each containing corresponding hypotheses of the L−1 last decoded bits, where L is the code constraint length, the corresponding states differing in how bits 1, 5, 9 and 13 were demodulated from slot (i).

At this point, the better of each corresponding pair of states from the two decoders may be selected. For example, for a constraint length 8 decoder, both decoders will have a metric corresponding to the last seven decoded bits being equal to 0000000. Whichever process produces the "better" metric for that bit pattern will be continued, the path history, metric and decoder type associated with the better metric being selected to survive. Likewise, both decoders have metrics corresponding to last seven bits 0000001, and the better of those will be selected; the decoder deemed to have been the better can be different for bit pattern 0000000 compared to bit pattern 0000001, so an indicator may be attached to each of the surviving states to indicate which decoder for bits from slot (i) was used. Likewise, each surviving state may have associated indicators, possibly different, indicating the decoder choices that were used in decoding bits from slots (i−i), (i−2) and (i−3) that have produced decoded bits in the state path histories. Because no more bits remain to be decoded from slot (i−3), its decoder indicators are no longer needed. However, as bits remain to be decoded from slots (i), (i−1) and (i−2), their indicators are held on a per-state basis to indicate how further bits from those slots should be decoded when extending a state.

FIG. 11 illustrates exemplary operations according to embodiments of the present invention relative to the interleaving pattern described with reference to FIG. 10. A first state memory 1110 for demodulating slot (i) bits using a first demodulation process and a second state memory 1120 for demodulating slot (i) bits using a second process are provided, each comprising 128 rows r(0), r(1), . . . , r(127) of values, each row corresponding to a different hypothesis for the last (L−1)=7 decoded bits, where the exemplary code constraint length L=8. Each row of the state memories 1110, 1120 contains a path history of previously decoded bits that are no longer within the last seven decoded bits, associated metric m0, m1, . . . , m127 for state 0000000 through state 1111111, and three associated indicators E(i−3), E(i−2), E(i−1) that indicate whether the first or second decoding process has already been decided for bits plucked from slot (i−3), slot (i−2) and slot (i−1), respectively. As shown, no decoding method has yet been decided for slot (i), the first processing method being used to update the first state memory 1110 and the second processing method being used to update the second state memory 1120. In general, the last 7 information bits are designated b8, b7, b6, b5, b4, b3 and b2 while the first information bit b1 has passed out of the "last 7" region and into the path history. Assuming a rate ½ code, a deinterleaver selects two coded or modem bits from the slots of FIG. 10 to decode each bit in the rows of the state memories 1110, 1120. Therefore, the decoded information bit designated b8 is the result of processing coded bits 16 and 15 from slot (i−2) and slot (i−1), respectively, bit b7 is the result of processing coded bits 14 and 13 from slot (i−3) and slot (i), respectively, and so on. Thus, encircled bits b1, b3, b5 and b7 involve processing coded bits selected from slot (i) by the first process to produce the metrics of the first state memory 1110 and by the second process to produce the metrics of the second state memory 1120. Bits b2, b4, b6 and b8, however, only involve processing coded bits from slots (i−1), (i−2) and (i−3) for which a decoding method is already decided and indicated by corresponding per-state indicators E(i−1), E(i−2), E(i−3).

At the point illustrated in FIG. 11, a processing technique is to be decided for slot (i), which has ¼ of its symbols processed. This is done by comparing the metric (m0) of the first state memory 1110 with the corresponding metric m0 of the second state memory 1120 and deciding which metric is indicative of a higher likelihood of correct decoding. The best metric then determines the selection either of path history 0 from the first state memory 1110 or the second state memory 1120 along with the corresponding indicators E(i−3), E(i−2), E(i−1) and metric m0 to survive. Thus, an entire row r(0) is selected either from the first state memory 1110 or the second state memory 1120 to be a new row r(0) for continuing decoding. Moreover, a new indicator E(i) is shifted into the three indicator positions, displacing E(i−3), as it is no longer needed, there being no more bits to process from slot (i−3). The new indicator E(i) indicates from which state memory 1110, 1120 the new row r(0) was selected. The selection process is repeated to select between the two rows r(1) based on the metrics m1, the two rows r(2) based on the metrics m2, and so on, until a surviving row has been decided in all 128 rows of each state memory 1110, 1120. Each state memory 1110, 1120 after this selection process, now contains the same information, but, as processing proceeds to decode slot (i+1) using the first process and the second process, respectively, the contents of the two state memories 1110, 1120 will generally diverge. After decoding ¼ of the symbols from slot (i+1), however, the process is repeated and the two state memories 1110, 1120 may converge by repeating the best-of-pairs selection process.

The above-described technique of trying both decoding methods for a new slot for some fraction of the symbols and then freezing the selection on a per-state basis for the remaining symbols can be extended to leaving open the choice of decoder for more than just the latest slot to be deinterleaved. For example, if the choice of decoder was undecided for slot (i) and slot (i−1), four decoder state memories could be used, corresponding to the four as yet undecided possibilities for the indicators E(i) and E(i−1), only the decided indicators E(i−2) and E(i−3) being entered into each row. Then, after processing ¼ of the symbols of slot (i) and ½ of the symbols of slot (i−1) the indicator E(i−1) for slot (i−1) could be decided by selecting the better of pairs of corresponding metrics from the decoders corresponding to E(i)=1 to yield the surviving rows for a first converged decoder with E(i)=1 and selecting the better of pairs of corresponding metrics for the two decoders with E(i)=2 to decide the surviving rows for E(i)=2. The number of decoders is expanded to four again by decoding slot (i+1) by the first and the second method, corresponding to as yet undecided method indicator E(i+1). Thus, at the cost of running four decoders which are periodically converged to two by choice of a method indicator, the choice of the decoding method for a slot is left open until ½ of its soft symbols have been processed, as opposed to making the decision after only ¼ of its symbols have been processed, as in the example described with reference to FIGS. 10 and 11.

Applying the technique describe with reference to FIG. 11 to the CDMA slot channel structure of FIG. 9, it can be seen that an interleaving pattern may be constructed using the 16 slots of FIG. 9. The processing apparatus may then proceed to process $1/16^{th}$ of the symbols from the current slot by some or all available processing methods, having already processed $1/16^{th}$ of the symbols of the previous slot, $2/16$ths from the next previous slot, and $15/16$ths from the oldest slot not yet exhausted. With 256 symbols per slot, this corresponds to taking a decision on the method for continued processing of the remaining $15/16$ths of the symbols in a slot after processing $1/16$ of its symbols, assuming only the latest slot is decoded using both methods, for all decoder states, i.e. using two decoder state memories. If four state memories are used, the decision as to which processing technique is used can be delayed for two slots until $1/8^{th}$ of a slot's symbols are processed, and so forth. Increasing the number of symbols processed before a decoding method indicator is decided may increase the likelihood of a reliable decision.

It has been described above how data can be processed using multiple demodulation techniques and decisions made on the method which succeeds best. These decisions may be independent for different time-segments of a received signal, and the best decision may be made independently for each time segment. Demodulation, combining and decoding techniques that may be used with the present invention are described herein, including, for example, variations of RAKE or G-RAKE processing for CDMA signals, as well as interference canceling receivers, diversity and non-diversity receivers, forward/backward time demodulators, and fast and slow channel tracking methods for tracking changes in channel estimates due to greater or lesser receiver velocities. Although the above description discusses the used of two demodulators, the present invention can be used with 3 or more demodulators.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of processing a spread spectrum signal, the method comprising:
   correlating the spread spectrum signal with a spreading sequence at a plurality of correlation times to produce a plurality of time-offset correlations;
   processing the plurality of time-offset correlations using a first demodulation technique to produce a first symbol representation for a symbol;
   determining a first quality for the first symbol representation; and
   responsive to the determined first quality, determining whether to further process the first symbol representation, or whether to process a second symbol representation generated using a second demodulation technique different from the first demodulation technique for the symbol generated from the spread spectrum signal.

2. The method of claim 1, comprising generating the second symbol representation from the spread spectrum signal before determining whether to further process the first symbol representation or to process the second symbol representation for the symbol generated from the spread spectrum signal.

3. The method of claim 1, comprising generating the second symbol representation from the spread spectrum signal after determining whether to further process the first symbol representation or to process the second symbol representation for the symbol generated from the spread spectrum signal.

4. The method of claim 1, wherein determining a first quality for the first symbol representation comprises:
   decoding the first symbol representation; and
   determining the first quality responsive to the decoding of the first symbol representation.

5. The method of claim 4:
   wherein decoding the first symbol representation comprises decoding the first symbol representation to generate decoded data; and
   wherein determining the first quality responsive to the decoding of the first symbol representation comprises error checking the decoded data.

6. The method of claim 5, wherein error checking the decoded data comprises performing at least one of a cyclic redundancy check (CRC), a bit error rate determination, and a Reed-Solomon decoding of the decoded data.

7. The method of claim 5, wherein determining the first quality responsive to the decoding of the first symbol representation comprises generating a decoding metric as part of the decoding of the first symbol representation.

8. The method of claim 1, wherein determining a first quality for the first symbol representation comprises determining a soft output that indicates a level of confidence in the first symbol representation.

9. The method of claim 1, wherein the first symbol representation is an output of a RAKE demodulation process and wherein the second symbol representation is an output of a generalized RAKE (G-RAKE) demodulation process.

10. The method of claim 9, wherein determining whether to further process the first symbol representation or to process a second symbol representation is preceded by:
generating the second symbol representation from the spread spectrum signal according to the G-RAKE demodulation process;
storing the first and second symbol representations; and
determining a second quality for the second symbol representation; and
wherein determining whether to further process the first symbol representation comprises determining whether to process the stored first symbol representation or the second symbol representation based on a comparison of the first quality and the second quality.

11. The method of claim 1, wherein determining whether to further process the first symbol representation or to process a second symbol representation for the symbol generated from the spread spectrum signal comprises determining whether to further process first decoded data corresponding to the first symbol representation or second decoded data corresponding to the second symbol representation.

12. A method of processing a spread spectrum signal, the method comprising:
correlating the spread spectrum signal with a spreading sequence at a first plurality of correlation times to produce a first plurality of time-offset correlations;
processing the first plurality of time-offset correlations using a first demodulation technique to produce a first symbol representation for a symbol;
determining a first quality for the first symbol representation; and
responsive to the determined first quality failing to meet a predetermined criterion processing a second plurality of time-offset correlations of the spread spectrum signal with the spreading sequence using a second demodulation technique different from the first demodulation technique to produce a second symbol representation.

13. The method of claim 12, wherein the first and second pluralities of time-offset correlations are both generated before processing the first plurality of time-offset correlations to produce the first symbol representation.

14. The method of claim 12, wherein the second plurality of time-offset correlations is generated responsive to the first quality failing to meet the predetermined criterion.

15. The method of claim 12, wherein processing a second plurality of time-offset correlations of the spread spectrum signal with the spreading sequence to produce the second symbol representation responsive to the determined first quality failing to meet a predetermined criterion is preceded by correlating the spread spectrum signal with the spreading sequence at a second plurality of correlation times to produce the second plurality of time-offset correlations.

16. The method of claim 15, further comprising determining the first and second pluralities of correlation times based on a channel estimate.

17. The method of claim 16, wherein determining the first and second pluralities of correlation times based on a channel estimate comprises the step of determining a first one of the first and second pluralities of correlation times based on a channel estimate and determining a second one of the first and second pluralities of correlation times based on a channel estimate and information regarding an interfering spread spectrum signal.

18. The method of claim 12:
wherein processing the first plurality of time-offset correlations to produce a first symbol representation for a symbol comprises combining the first plurality of time-offset correlations according to a first combination scheme to produce the first symbol representation; and
wherein processing a second plurality of time-offset correlations of the spread spectrum signal with the spreading sequence to produce the second symbol representation for the symbol responsive to the determined first quality failing to meet a predetermined criterion comprises combining the second plurality of time-offset correlations according to a second combination scheme to produce the second symbol representation.

19. The method of claim 18, further comprising determining a first one of the first and second combination schemes from a channel estimate and determining a second one of the first and second combination schemes from a channel estimate and information regarding an interfering spread spectrum signal.

20. The method of claim 12, wherein processing a second plurality of time-offset correlations to produce the second symbol representation responsive to the first quality failing to meet a predetermined criterion is followed by:
determining a second quality for the second symbol representation; and
further processing a selected one of the first and second symbol representations based on a comparison of the determined first and second qualities.

21. The method of claim 12, wherein generation of the first symbol representation consumes less of a selected resource than generation of the second symbol representation.

22. The method of claim 12, wherein determining a first quality for the first symbol representation comprises:
decoding the first symbol representation; and
determining the first quality responsive to the decoding of the first symbol representation.

23. The method of claim 22:
wherein decoding the first symbol representation comprises decoding the first symbol representation to generate decoded data; and
wherein determining the first quality responsive to the decoding of the first symbol representation comprises error checking the decoded data.

24. The method of claim 23, wherein error checking the decoded data comprises performing at least one of a cyclic redundancy check (CRC), a bit error rate determination, and a Reed-Solomon decoding of the decoded data.

25. The method of claim 23, wherein determining the first quality responsive to the decoding of the first symbol representation comprises generating a decoding metric as part of the decoding of the first symbol representation.

26. The method of claim 12, wherein determining a first quality for the first symbol representation comprises determining a soft output that indicates a level of confidence in the first symbol representation.

27. The method of claim 12, wherein the first symbol representation is an output of a RAKE demodulation process and wherein the second symbol representation is an output of a generalized RAKE (G-RAKE) demodulation process.

28. The method of claim 12, wherein determining whether to further process the first symbol representation or to process a second symbol representation for the symbol generated from the spread spectrum signal comprises determining whether to further process first decoded data corresponding to the first symbol representation or second decoded data corresponding to the second symbol representation.

29. The method of claim 12, wherein the order in which the first and second symbol representations are generated is adaptively selected.

30. The method of claim 29, wherein the order in which the first and second symbol representations are generated is selected responsive to a decoding history.

31. The method of claim 29, wherein the order in which the first and second symbol representations are generated is selected based on a decoding history of at least one of a slot and a frame.

32. A method of processing a spread spectrum signal, the method comprising:
    correlating the spread spectrum signal with a spreading sequence at respective first and second pluralities of correlation times to produce respective first and second pluralities of time-offset correlations;
    processing respective ones of the first and second pluralities of time-offset correlations using respective, different first and second demodulation techniques to produce respective first and second symbol representations for a symbol;
    determining at least one quality for at least one of the first and second symbol representations; and
    responsive to the determined at least one quality, determining whether to further process one of the first symbol representation or the second symbol representation.

33. The method of claim 32, wherein determining at least one quality for at least one of the first and second symbol representations comprises:
    decoding at least one of the first and second symbol representations; and
    determining the at least one quality responsive to the decoding of the at least one of the first and second symbol representations.

34. The method of claim 33:
    wherein decoding at least one of the first and second symbol representations comprises decoding at least one of the first and second symbol representations to generate corresponding decoded data; and
    wherein determining the at least one quality responsive to the decoding of the at least one of the first and second symbol representations comprises error checking the decoded data.

35. The method of claim 34, wherein error checking the decoded data comprises performing at least one of a cyclic redundancy check (CRC), a bit error rate determination, and a Reed-Solomon decoding of the decoded data.

36. The method of claim 34, wherein determining the at least one quality responsive to the decoding of the at least one of the first and second symbol representations comprises generating at least one decoding metric as part of the decoding of the at least one of the first and second symbol representations.

37. The method of claim 32, wherein determining a least one quality for at least one of the first and second symbol representations comprises determining at least one soft output that indicates level of confidence in the at least one of the first and second symbol representations.

38. The method of claim 32:
    wherein determining at least one quality for at least one of the first and second symbol representations comprises determining respective first and second qualities for respective ones of the first and second symbol representations; and
    wherein determining whether to further process one of the first symbol representation or the second symbol representation based on the determined at least one quality comprises determining whether to further process one of the first and second symbol representations based on a comparison of the determined first and second qualities.

39. The method of claim 32:
    wherein determining at least one quality for at least one of the first and second symbol representations comprises:
    decoding a first selected one of the first and second symbol representations to generate first decoded data; and
    determining a corresponding decoding quality responsive to the decoding of the first selected one of the first and second symbol representations; and
    wherein determining whether to further process one of the first symbol representation or the second symbol representation based on the determined at least one quality comprises determining whether to further process the first decoded data or to decode a second selected one of the first and second symbol representations to generate second decoded data based on the determined decoding quality.

40. The method of claim 39, wherein decoding a first selected one of the first and second symbol representations to generate first decoded data is preceded by adaptively selecting the first selected one of the first and second symbol representations.

41. The method of claim 40, wherein the first selected one of the first and second symbol representations is selected based on a decoding history.

42. The method of claim 40, wherein the first selected one of the first and second symbol representations is selected based on a decoding history of at least one of a slot and a frame.

43. The method of claim 32:
    wherein determining at least one quality for at least one of the first and second symbol representations comprises:
    partially decoding respective ones of the first and second symbol representations; and determining respective first and second qualities for respective ones of the first and second symbol representations responsive to the partial decoding of the first and second symbol representations; and
    wherein determining whether to further process one of the first symbol representation or the second symbol representation based on the determined at least one quality comprises determining whether to further decode one of the first or second symbol representations based on a comparison of the determined first and second qualities.

44. The method of claim 32:
    wherein determining at least one quality for at least one of the first and second symbol representations comprises:
    syndrome decoding respective ones of the first and second symbol representations; and
    determining respective first and second qualities for respective ones of the first and second symbol representations responsive to the syndrome decoding of the first and second symbol representations; and wherein determining whether to further process one of the first symbol representation or the second symbol representation based on the determined at least one quality comprises determining whether to further decode one of the first or second symbol representations based on a comparison of the determined first and second qualities.

45. The method of claim 32, further comprising determining the first and second pluralities of correlation times based on a channel estimate.

46. The method of claim 45, wherein determining the first and second pluralities of correlation times based on a channel estimate comprises the step of determining a first one of the first and second pluralities of correlation times based on a channel estimate and determining a second one of the first and second pluralities of correlation times based on a channel estimate and information regarding an interfering spread spectrum signal.

47. The method of claim 32, wherein processing respective ones of the first and second pluralities of time-offset correlations to produce respective first and second symbol representations for a symbol comprises combining respective ones of the first and second pluralities of time-offset correlations according to respective first and second combination schemes to produce respective ones of the first and second symbol representations.

48. The method of claim 47, further comprising determining a first one of the first and second combination schemes from a channel estimate and determining a second one of the first and second combination schemes from a channel estimate and information regarding an interfering spread spectrum signal.

49. The method of claim 32, wherein the first symbol representation is an output of a RAKE demodulation process and wherein the second symbol representation is an output of a generalized RAKE (G-RAKE) demodulation process.

50. A method of processing a spread spectrum signal, the method comprising:
   demodulating the spread spectrum signal according to a first demodulation technique by combining received samples using a first set of combining weights to generate a first symbol representation for a symbol;
   determining a first quality for the first symbol representation; and
   responsive to the determined first quality, selectively demodulating the spread spectrum signal according to a second demodulation technique by combining the received samples using a second set of combining weights to generate a second symbol representation for a symbol.

51. The method of claim 50, wherein the first and second demodulation techniques are operative to provide different levels of performance in a given interference environment.

52. The method of claim 50, wherein the spread spectrum signal comprises a first spread spectrum signal, wherein a first one of the first and second demodulation techniques is operative to provide superior performance in an interference environment dominated by one or more second spread spectrum signals transmitted from one or more signal sources ether than a source of the first spread spectrum signal, and wherein a second one of the first and second demodulation techniques is operative to provide superior performance in an interference environment dominated by one or more third spread spectrum signals transmitted from the source of the first spread spectrum signal.

53. The method of claim 50, wherein the first and second symbol representations are generated in series.

54. The method of claim 50, wherein a first one of the first and second demodulation techniques comprises a RAKE demodulation process, and wherein a second one of the first and second demodulation techniques comprises a generalized RAKE (G-RAKE) demodulation process.

55. A method of processing a communications signal, the method comprising:
   demodulating the communications signal according to a first demodulation technique by combining received samples using a first set of combining weights to produce first symbol representations;
   demodulating the communications signal according to a second demodulation technique by combining received samples using a second set of combining weights to produce respective second symbol representations;
   decoding a first one of the first and second symbol representations to determine a quality for the first one of the first and second symbol representations; and
   responsive to the determined quality, determining whether to further process the first symbol representation or to decode the second symbol representation.

56. The method of claim 55, wherein the first and second demodulation techniques comprise respective first and second spread spectrum demodulation processes.

57. The method of claim 56, wherein the first and second demodulation techniques comprise respective ones of a RAKE demodulation process and a generalized RAKE (G-RAKE) demodulation process.

58. The method of claim 55, wherein the first and second demodulation techniques comprise respective non-spread spectrum demodulation processes.

59. The method of claim 55, comprising adaptively selecting the first one of the first and second symbol representations for first decoding.

60. The method of claim 59, wherein adaptively selecting the first one of the first and second symbol representations for first decoding comprises selecting the first one of the first and second symbol representations for first decoding responsive to a partial decoding of at least one of the first and second symbol representations.

61. The method of claim 59, wherein adaptively selecting the first one of the first and second symbol representations for first decoding comprises selecting the first one of the first and second symbol representations for first decoding responsive to a syndrome decoding of the first and second symbol representations.

62. The method of claim 59, wherein symbol representations produced by the first and second demodulation techniques comprise soft values that indicate a level of confidence in the symbol representations, and wherein adaptively selecting the first one of the first and second symbol representations for first decoding comprises selecting the first one of the first and second symbol representations for first decoding responsive to the soft output values.

63. The method of claim 62, wherein selecting the first one of the first and second symbol representations for first decoding responsive to the soft output values comprises selecting the first one of the first and second symbol representations for first decoding responsive to a history of the soft output values produced by the first and second demodulation techniques.

64. The method of claim 59, wherein adaptively selecting the first one of the first and second symbol representations for first decoding comprises selecting the first one of the first and second symbol representations for first decoding based on a decoding history.

65. The method of claim 64, wherein the decoding history comprises a decoding history of at least one of slot and a frame.

66. A spread spectrum receiver, comprising:
a multi-process demodulator circuit operative to process a spread spectrum signal according to respective, different first and second demodulation processes to produce respective, different first and second symbol representations for a symbol; and
a quality discriminator circuit operative to selectively output decoded data corresponding to a selected one of the first and second symbol representations based on a quality of at least one of the first and second symbol representations, wherein the spread spectrum signal comprises a first spread spectrum signal, wherein a first one of the first and second demodulation processes is operative to provide superior performance in an interference environment dominated by one or more second spread spectrum signals transmitted from one or more signal sources other than a source of the first spread spectrum signal, and wherein a second one of the first and second demodulation process is operative to provide superior performance in an interference environment dominated by one or more third spread spectrum signals transmitted from the source of the first spread spectrum signal.

67. A receiver according to claim 66, wherein the first and second demodulation processes are operative to provide different levels of performance in a given interference environment.

68. A receiver according to claim 66, wherein the multi-process demodulator circuit is operative to generate the first and second symbol representations in series.

69. A receiver according to claim 66, wherein the multi-process demodulator circuit is operative to generate the first and second symbol representations in parallel.

70. A receiver according to claim 69, wherein the quality discriminator circuit is operative to output decoded data corresponding to a selected one of the first and second symbol representations based on a comparison of first and second qualities of the first and second symbol representations.

71. A receiver according to claim 66, wherein the quality discriminator circuit is operative to output decoded data corresponding to a selected one of the first and second symbol representations based on a decoding of at least one of the first and second symbol representations.

72. A receiver according to claim 66, wherein a first one of the first and second demodulation processes comprises a RAKE demodulation process, and wherein a second one of the first and second demodulation processes comprises a generalized RAKE (G-RAKE) demodulation process.

73. A receiver according to claim 66, wherein the multi-process demodulator circuit comprises:
a correlator circuit operative to correlate the spread spectrum signal at a plurality of selected correlation times to produce a plurality of time-offset correlations; and
a correlation processor circuit operative to process the plurality of correlation times to generate a symbol representation.

74. A receiver according to claim 73, wherein the correlation processor circuit comprises a combiner circuit operative to combine the plurality of time-offset correlations according to selected combining weighting factors.

75. A receiver according to claim 74, wherein the discriminator circuit is operative to generate a quality indicator that indicates a quality of a symbol representation generated by the multi-process demodulator, and wherein the combiner circuit is operative to select the combining weighting factors responsive to the quality indicator.

76. A receiver according to claim 73, wherein the discriminator circuit is operative to generate a quality indicator that indicates a quality of a symbol representation generated by the multi-process demodulator, and wherein the correlator circuit is operative to select the plurality of correlation times responsive to the quality indicator.

77. A receiver according to claim 66, wherein the quality discriminator circuit comprises:
a decoder operative to decode the first and second symbol representations; and
a quality indicator generator circuit operative to generate a quality indicator responsive to a decoding of a symbol representation.

78. A receiver according to claim 77, wherein the quality indicator comprises a decoding metric.

79. A receiver according to claim 77, wherein the quality indicator generator circuit comprises an error checking circuit.

80. A receiver according to claim 66, wherein the receiver comprises a radio processor operative to receive a radio frequency spread spectrum communications signal and to generate a signal sample therefrom, and wherein the multi-process demodulator circuit is operative to generate the first and second symbol representations from the signal sample.

81. A receiver according to claim 80, included in one of a wireless communications terminal or a wireless communications base station.

82. A receiver, comprising:
a multi-process demodulator circuit operative to process a communications signal according to respective, different first and second demodulation techniques by combining received samples using first and second sets of combining weights respectively to produce respective, different first and second symbol representations; and
a quality discriminator circuit operative to decode a first one of the first and second symbol representations to determine a quality for the first one of the first and second symbol representations and, responsive to the determined quality, to determine whether to further process the first symbol representation or to decode the second symbol representation.

83. A receiver according to claim 82, wherein the first and second demodulation techniques comprise respective first and second spread spectrum demodulation processes.

84. A receiver according to claim 83, wherein the first and second demodulation techniques comprise respective ones of a RAKE demodulation process and a generalized RAKE (G-RAKE) demodulation process.

85. A receiver according to claim 82, wherein the first and second demodulation techniques comprise respective non-spread spectrum demodulation processes.

86. A receiver according to claim 82, wherein the quality discriminator circuit is operative to adaptively select the first one of the first and second symbol representations for first decoding.

87. A receiver according to claim 86, wherein the quality discriminator circuit is operative to select the first one of the first and second symbol representations for first decoding responsive to a partial decoding of at least one of the first and second symbol representations.

88. A receiver according to claim 86, wherein the quality discriminator circuit is operative to select the first one of the first and second symbol representations for first decoding responsive to a syndrome decoding of the first and second symbol representations.

89. A receiver according to claim 86, wherein symbol representations produced by the multi-process demodulator circuit comprise soft values that indicate a level of confidence in the symbol representations, and wherein the quality discriminator circuit is operative to select the first one of the first and second symbol representations for first decoding responsive to the soft output values.

90. A receiver according to claim 89, wherein the quality discriminator circuit is operative to select the first one of the first and second symbol representations for first decoding responsive to a history of the soft output values produced by the first and second demodulation techniques.

91. A receiver according to claim 86, wherein the quality discriminator circuit is operative to select the first one of the first and second symbol representations for first decoding based on a decoding history.

92. A receiver according to claim 91, wherein the decoding history comprises a decoding history of at least one of slot and a frame.

93. A receiver according to claim 82, wherein the receiver further comprises a radio receiver operative to receive a radio frequency signal and to generate a signal sample therefrom, and wherein the multi-process demodulator is operative to generate the first and second symbol representations from the signal sample.

94. A receiver according to claim 93, included in one of a wireless communications terminal and a wireless communications base station.

95. An apparatus for processing a spread spectrum signal, the apparatus comprising:
    means for correlating the spread spectrum signal with a spreading sequence at a first plurality of correlation times to produce a first plurality of time-offset correlations;
    means for processing the first plurality of time-offset correlations using a first demodulation technique to produce a first symbol representation for a symbol;
    means for determining a first quality for the first symbol representation; and
    means, responsive to the determined first quality, for determining whether to further process the first symbol representation, or whether to process a second symbol representation for the symbol generated from the spread spectrum signal using a second demodulation technique different from the first demodulation technique.

96. An apparatus according to claim 95, comprising means for generating the second symbol representation from the spread spectrum signal before determining whether to further process the first symbol representation or to process the second symbol representation for the symbol generated from the spread spectrum signal.

97. An apparatus according to claim 95, comprising means for generating the second symbol representation from the spread spectrum signal after determining whether to further process the first symbol representation or to process the second symbol representation for the symbol generated from the spread spectrum signal.

98. An apparatus according to claim 95, wherein the means for determining a first quality for the first symbol representation comprises:
    means for decoding the first symbol representation; and
    means for determining the first quality responsive to the decoding of the first symbol representation.

99. An apparatus according to claim 98:
    wherein the means for decoding the first symbol representation comprises means for decoding the first symbol representation to generate decoded data; and
    wherein the means for determining the first quality responsive to the decoding of the first symbol representation comprises means for error checking the decoded data.

100. An apparatus according to claim 99, wherein the means for error checking the decoded data comprises means for performing at least one of a cyclic redundancy check (CRC), a bit error rate determination, and a Reed-Solomon decoding of the decoded data.

101. An apparatus according to claim 99, wherein the means for determining the first quality responsive to the decoding of the first symbol representation comprises means for generating a decoding metric as part of the decoding of the first symbol representation.

102. An apparatus according to claim 95, wherein the means for determining a first quality for the first symbol representation comprises means for determining a soft output that indicates a level of confidence in the first symbol representation.

103. An apparatus according to claim 95, wherein the first symbol representation is an output of a RAKE demodulation process and wherein the second symbol representation is an output of a generalized RAKE (G-RAKE) demodulation process.

104. An apparatus according to claim 95, wherein the means for determining whether to further process the first symbol representation or to process a second symbol representation for the symbol generated from the spread spectrum signal comprises means for determining whether to further process first decoded data corresponding to the first symbol representation or second decoded data corresponding to the second symbol representation.

105. The method of claim 50 wherein said received samples comprise time offset correlations and further comprising generating a plurality of time offset correlations by correlating the spread spectrum signal with a spreading sequence at different respective correlation times.

106. The method of claim 50 wherein said first said second sets of combining weights provide different degrees of interference suppression.

107. The method of claim 55 wherein said received samples comprise time offset correlations and further comprising generating a plurality of time offset correlations by correlating the spread spectrum signal with a spreading sequence at different respective correlation times.

108. The method of claim 55 wherein said first said second sets of combining weights provide different degrees of interference suppression.

109. The receiver of claim 82 wherein said received samples comprise time offset correlations and further comprising a plurality of correlators to produce said time offset correlations using different respective correlation times.

110. The receiver of claim 82 wherein said first said second sets of combining weights provide different degrees of interference suppression.

* * * * *

UNITED STATES PATENT AND TRADEMARK OFFICE
CERTIFICATE OF CORRECTION

| | | |
|---|---|---|
| PATENT NO. | : 7,440,489 B2 | Page 1 of 1 |
| APPLICATION NO. | : 09/923374 | |
| DATED | : October 21, 2008 | |
| INVENTOR(S) | : Dahlman et al. | |

It is certified that error appears in the above-identified patent and that said Letters Patent is hereby corrected as shown below:

In Column 15, Line 38, delete "(i-i)," and insert -- (i-1), --, therefor.

In Column 15, Line 40, delete "(i-i)" and insert -- (i-1) --, therefor.

In Column 16, Line 16, delete "(i-i)," and insert -- (i-1), --, therefor.

In Column 23, Line 59, in Claim 52, delete "ether" and insert -- other --, therefor.

Signed and Sealed this

Twenty-sixth Day of May, 2009

JOHN DOLL
*Acting Director of the United States Patent and Trademark Office*